US012753305B2

(12) United States Patent
Rich et al.

(10) Patent No.: US 12,753,305 B2
(45) Date of Patent: Oct. 6, 2026

(54) BLEND OF POLYARYLETHER KETONE COPOLYMER

(71) Applicant: SYENSQO SPECIALTY POLYMERS USA, LLC, Alpharetta, GA (US)

(72) Inventors: Jason Rich, Roswell, GA (US); Mohammad Jamal El-Hibri, Atlanta, GA (US)

(73) Assignee: Syensqo Specialty Polymers USA, LLC, Alpharetta, GA (US)

( * ) Notice: Subject to any disclaimer, the term of this patent is extended or adjusted under 35 U.S.C. 154(b) by 1147 days.

(21) Appl. No.: 17/775,551

(22) PCT Filed: Nov. 5, 2020

(86) PCT No.: PCT/EP2020/081214
§ 371 (c)(1),
(2) Date: May 9, 2022

(87) PCT Pub. No.: WO2021/089746
PCT Pub. Date: May 14, 2021

(65) Prior Publication Data
US 2025/0270403 A1 Aug. 28, 2025

Related U.S. Application Data

(60) Provisional application No. 62/932,739, filed on Nov. 8, 2019.

(51) Int. Cl.
*C08L 71/00* (2006.01)
*C08J 5/24* (2006.01)
(Continued)

(52) U.S. Cl.
CPC ................. *C08L 71/00* (2013.01); *C08J 5/24* (2013.01); *C08L 81/06* (2013.01); *E21B 43/00* (2013.01);
(Continued)

(58) Field of Classification Search
CPC ...... C08L 81/06; C08L 71/10; C08G 65/4012
See application file for complete search history.

(56) References Cited

U.S. PATENT DOCUMENTS 4,713,426 A * 12/1987 Harris .................... C08L 71/00 525/534
5,662,170 A 9/1997 Donovan et al.
(Continued)

FOREIGN PATENT DOCUMENTS

EP 0332012 A1 * 9/1989 ............. C08L 81/06
WO 2001061232 A1 8/2001
(Continued)

OTHER PUBLICATIONS

Partial machine translation of EP-0332012-A1 (Year: 1989).*
(Continued)

*Primary Examiner* — Kregg T Brooks
(74) *Attorney, Agent, or Firm* — Osha Bergman Watanabe & Burton LLP

(57) ABSTRACT

The invention pertains to a polymer blend based on PEDEK-PEEK copolymer, which, thanks to the predominance of PEDEK-type units in the copolymer (PEDEK-PEEK), and to the blending with a polyphenylsulfone polymer (PPSU), is effective in delivering superior combination of improved strength and modulus at elevated temperatures and improved ductility, and which is endowed with beneficial partial miscibility behaviour, which is unexpected and advantageous, both for retaining similar high temperature resistance of polymer (PPSU) component, but also for avoiding phase separation and/or reduction in crystallization rate and loss of high temperature performances.

20 Claims, 4 Drawing Sheets

(51) Int. Cl.
*C08L 81/06* (2006.01)
*E21B 43/00* (2006.01)

(52) U.S. Cl.
CPC ........ *C08J 2371/00* (2013.01); *C08J 2381/06* (2013.01); *C08J 2471/00* (2013.01); *C08J 2481/06* (2013.01)

(56) References Cited

U.S. PATENT DOCUMENTS

| | | | |
|---|---|---|---|
| 6,085,799 | A | 7/2000 | Kodaissi et al. |
| 6,123,114 | A | 9/2000 | Seguin et al. |
| 6,655,456 | B1 | 12/2003 | Yokley et al. |
| 6,863,124 | B2 | 3/2005 | Araux et al. |
| 7,874,356 | B2 | 1/2011 | Corre et al. |
| 10,119,023 | B2 | 11/2018 | Weinberg et al. |
| 2010/0239441 | A1 | 9/2010 | Bade et al. |
| 2012/0234603 | A1 | 9/2012 | Vail, III |
| 2018/0282542 | A1 | 10/2018 | Chaplin et al. |
| 2019/0136055 | A1 | 5/2019 | El-Hibri |
| 2023/0287176 | A1 | 9/2023 | Rich et al. |
| 2023/0416486 | A1 | 12/2023 | Di Nicolo'et al. |

FOREIGN PATENT DOCUMENTS

| | | | |
|---|---|---|---|
| WO | 2010112435 | A1 | 10/2010 |
| WO | 2014177392 | A1 | 11/2014 |
| WO | 2017186922 | A1 | 11/2017 |
| WO | 2017186926 | A1 | 11/2017 |
| WO | 2018086873 | A1 | 5/2018 |
| WO | 2019053238 | A1 | 3/2019 |
| WO | 2019053239 | A1 | 3/2019 |

OTHER PUBLICATIONS

Office Action received in Corresponding U.S. Appl. No. 17/775,563 mailed on Feb. 21, 2025 (18 pages).

Murphy J., in "Additives for Plastics Handbook", 2nd Edition, 2001, Chapter 5.2.3., p. 43-48—Elsevier Advanced Technology (8 pages).

International Search Report issued in International Application No. PCT/EP2020/081214, mailed Feb. 5, 2021 (3 pages).

Written Opinion issued in International Application No. PCT/EP2020/081214, mailed Feb. 5, 2021 (5 pages).

Murphy, J., "Additives for Plastics Handbook," Elsevier Advanced Technology, 2nd Edition, pp. 43-48, 2001 (8 pages).

International Search Report issued in corresponding International Application No. PCT/EP2020/081215; dated Jan. 22, 2021 (3 pages).

Written Opinion of the International Searching Authority issued in corresponding International Application No. PCT/EP2020/081215; dated Jan. 22, 2021 (5 pages).

Office Action issued in related U.S. Appl. No. 17/775,563 dated Jul. 1, 2025 (8 pages).

* cited by examiner

BLEND OF POLYARYLETHER KETONE COPOLYMER

CROSS-REFERENCE TO RELATED APPLICATION

This application is a national stage entry under 35 U.S.C. § 371 of International Application No. PCT/EP2020/081214 filed 5 Nov. 2020, which claims priority to earlier US provisional application filed on 8 Nov. 2019 with No. 62/932,739. The entire contents of these applications are explicitly incorporated herein by this reference.

TECHNICAL FIELD

This invention pertains to novel compositions of polyarylether ketone copolymers and polyphenylsulfone polymers having improved thermal resistance and mechanical properties, to a method of making the same, and to the use thereof in various fields, such as oil and gas exploration and extraction.

BACKGROUND ART

Polyaryl ether ketone materials are known as high performance plastics with high thermal resistance, which are used for a number of industrial applications where resistance to extreme conditions is required.

In particular, oil & gas exploration requires materials able to resist high temperature and pressure, and capable of maintaining the required performances upon prolonged exposure in the said extreme pressure and temperature conditions to aggressive chemicals present in downhole environment, including notably salt water, hydrocarbons, $CO_2$, $H_2S$, etc.

In this area, hence polyether ether ketone (PEEK), having characterizing recurring unit of formula —O-Ph-O-Ph-CO-Ph-, with Ph=para-phenylene, has found broad utility, thanks to its crystalline melting point of about 340° C. enabling acceptable processing, although its glass transition temperature of about 150° C. is somewhat limiting its ability to withstand continuous operations at temperatures of 150° C. or beyond.

In this area, copolymers comprising a mixture of units —O-Ph-O-Ph-CO-Ph- (PEEK) and —O-Ph-Ph-O-Ph-CO-Ph- (PEDEK) have been proposed, as an attempt to provide materials possessing increased Tg over PEEK, while still exhibiting acceptable processing characteristics.

For instance, WO 2018/086873 discloses PEDEK-rich PEDEK-PEEK copolymers endowed with high temperature and excellent chemical resistance and mechanical properties. Their use in extremely high temperature applications (e.g. beyond 170° C.) is limited, however, by their glass transition temperatures (Tg) of about 170° C. While the crystallinity of PEDEK-PEEK allows use above 170° C., the strength and modulus is substantially reduced at these elevated temperatures. Now, some applications require the chemical resistance and other attributes of PEDEK-PEEK copolymers, but with even greater mechanical stiffness and strength at temperatures above 170° C. than can be provided by the PEDEK-PEEK copolymers thereby provided. It is incidentally acknowledged that this document broadly foresees the possible combination of the PEDEK-rich PEDEK-PEEK copolymers provided therein with a variety of other polymeric materials, including sulfone polymers, without nonetheless associating any distinctive advantageous attribute to these blending approaches.

With the limitations of these PEDEK-PEEK copolymers, there is hence an unmet need for polyaryl ether ketone-based materials that can provide higher temperature performance and improved mechanical properties than can be achieved with PEDEK-PEEK copolymers.

Blending different polymers, aimed at creating new materials altering the thermal, mechanical and impact properties without chemical modification is an approach which has been already pursued in the domain of polyaryl ether ketone. In addition, physical properties may be altered by blending, through modification of crystallisation behaviour of one or more of the blend components.

It has been known for decades, for instance, to blend polyphenylsulfone polymer (PPSU) into a PEEK polymer to improve, at least at a certain extent, the mechanical properties of PEEK in a certain temperature range; PEEK/PPSU blends are notably disclosed in U.S. Pat. No. 10,119,023. Further, for instance, WO 2014/177392 discloses the use of certain PEEK/PPSU blends for lining pipelines used in oil&gas operations, teaching notably that such blends are endowed with higher heat deflection temperature (e.g. a HDT of about 181° C. for a PEEK/PPSU blend 75/25 wt/wt), demonstrating better thermo-mechanical stability over reference PEEK liners. It is hence generally recognized in the art that PEEK/PPSU blends exhibit improved mechanical properties over PEEK at temperatures in a range of about 150-190° C., though there is a trade-off between mechanical and chemical resistance properties above the glass transition temperature of the blends due to the higher amorphous content.

There is hence a continuous quest in the art for polyaryl ether ketone polymers possessing an advantageous combination of thermal rating/thermal performances and chemical resistance, while maintaining outstanding mechanical performances, so as to provide materials suitable for being used in extremely demanding application, such as notably oil and gas exploration and extraction.

The polymer blends of PEDEK-rich PEDEK-PEEK copolymer and PPSU according to this invention address this unmet need.

Document WO2019/053239, which is generally directed to use of powdered blends of (i) PEEK-type materials possessing at least 50% moles of units of formula —O-Ph-O-Ph-CO-Ph- (PEEK units) and (ii) poly(aryl ether sulfone) polymers in Selective Laser Sintering (SLS) methods, further teaches that (i) said PEEK-type materials may possibly be PEEK copolymers, further comprising units of formula —O-Ph-Ph-O-Ph-CO-Ph-, i.e. PEDEK units, although in minor amount and that (ii) said poly(aryl ether sulfone) polymers may be PPSU having recurring units of formula:

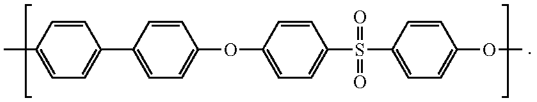

According to these teachings, the blending of poly(aryl ether sulfone) into PEEK materials is such to improve the recyclability and thermal stability in SLS processing conditions of the powdered blend thereof, without affecting the expected performances of PEEK, such as e.g. the toughness. Now, the Applicant has found that incorporation of sulfone polymers, in particular PPSU, in such PEEK-rich PEEK-PEDEK copolymers is not effective in delivering the targeted high temperature behaviour, such addition failing to deliver valuable performances enhancement at high temperatures.

SUMMARY OF INVENTION

It is hence a first object of the present invention a composition

[composition (C)] comprising:

at least one polyaryl ether ketone copolymer [copolymer (PEDEK-PEEK)] comprising:

recurring units ($R_{PEEK}$) of formula (I):

Formula (I)

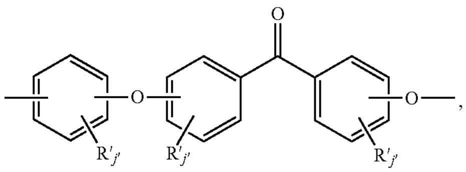

and recurring units ($R_{PEDEK}$) of formula (II):

Formula (II)

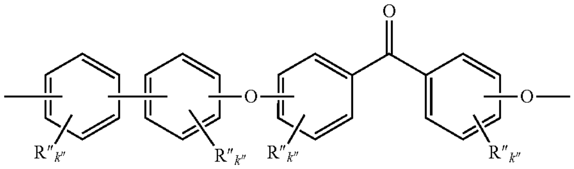

wherein in above formulae (I) and (II), each of R' and R", equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; each of j' and k", equal to or different from each other, is independently selected at each occurrence from 0 and an integer of 1 to 4;

wherein the said recurring units are comprised in a molar ratio ($R_{PEDEK}$):($R_{PEEK}$) of 55:45 to 99:1, and at least one sulfone polymer [polymer (SP)] selected from the group consisting of:

(PS-1) polyphenylsulfone polymers [polymer (PPSU)] comprising more than 50 mol %, with respect to all recurring units, of recurring units ($R_{PPSU}$) of formula (P-1):

(P-1)

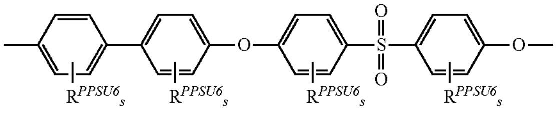

wherein each $R^{PPSU}$, equal to or different from each other at each instance, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each d, equal to or different from each other at each instance, is independently selected from 0, 1, 2, 3 and 4, preferably 0; and (PS-2) polyethersulfone polymers [polymer (PESU)] comprising more than 50 mol %, with respect to all recurring units, of recurring units ($R_{PESU}$) of formula (P-2):

(P-2)

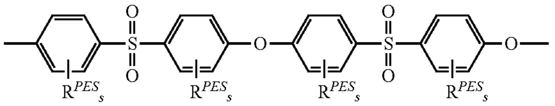

wherein each $R^{PESU}$, equal to or different from each other at each instance, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each e, equal to or different from each other at each instance, is independently selected from 0, 1, 2, 3 and 4, preferably 0.

The invention further pertains to a method of manufacturing the said composition (C), said method comprising blending in the molten state the said copolymer (PEDEK-PEEK) and the said polymer (SP).

The invention further notably pertains to a method of making parts included in devices used for oil & gas recovery, including moulding those parts from the inventive composition (C) as above detailed.

The Applicant has found that the inventive composition (C), as above detailed, thanks to the predominance of PEDEK-type units in the copolymer (PEDEK-PEEK), and to the blending with polymer (SP), is effective in delivering a superior combination of improved strength and modulus at elevated temperatures and improved ductility. Additionally the blend exhibits reduced viscosity for easier processing relative to PEDEK-PEEK copolymers, per se. The inventive composition (C) is therefore suitable for the manufacture of shaped articles that require a combination of high temperature performance, high ductility and impact resistance, chemical resistance, and high flow during processing. In particular, in oil and gas drilling and production applications, there is a long-felt need for melt processable, chemically resistant materials that can withstand higher temperatures and pressures: and the inventive composition (C) hereby provided fulfills such unmet need. Moreover, compositions of the invention are endowed with beneficial partial miscibility behaviour, which is unexpected and advantageous, both for retaining similar high temperature resistance of polymer (PPSU) component, but also for enabling avoiding phase separation (possibly related to complete immiscibility) and/or reduction in crystallization rate and loss of high temperature performances (possibly related to complete miscibility). In other words, the very limited partial miscibility is enough to make the blends effectively compatible while still being largely immiscible.

DESCRIPTION OF EMBODIMENTS

The Copolymer (PEDEK-PEEK)

Figure 1:
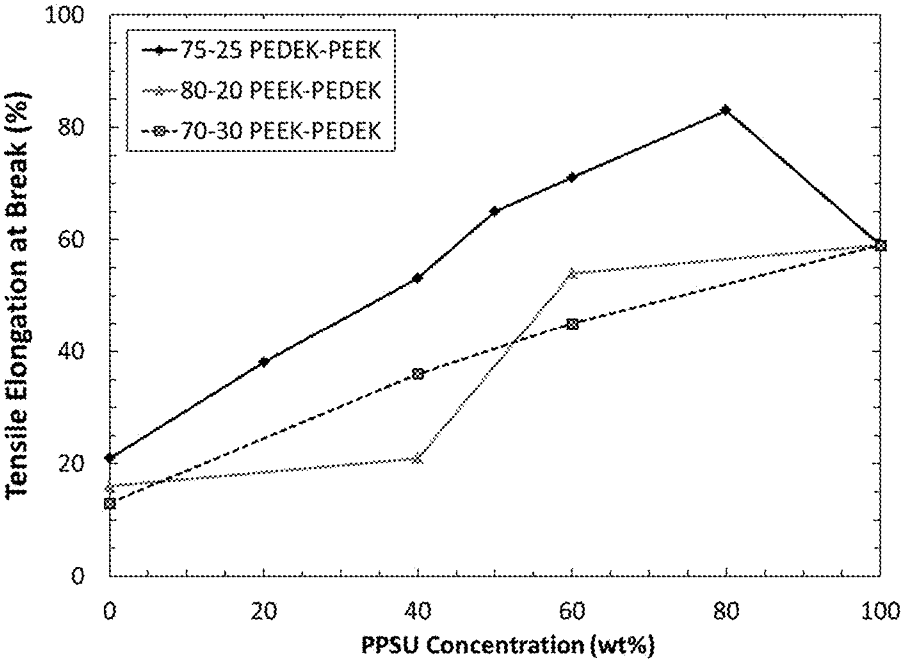
FIG. 1 sketches the tensile elongation at break data for representative working example based on PEDEK-rich PEDEK-PEEK copolymer and controls based on PEEK-rich PEEK-PEDEK copolymers, all including same amount of neat PPSU.

The copolymer (PEDEK-PEEK) comprises recurring units ($R_{PEDEK}$) and ($R_{PEEK}$) as above detailed in molar ratio ($R_{PEDEK}$):($R_{PEEK}$) of 55:45 to 99:1, preferably of 60:40 to 95:5, more preferably of 65:35 to 90:10, and even more preferably of 68:32 to 80:20. Copolymers (PEDEK-PEEK) which have been found particularly advantageous are those comprising recurring units ($R_{PEDEK}$) and ($R_{PEEK}$) as above detailed in molar ratio of ($R_{PEDEK}$):($R_{PEEK}$) of 70:30 to 80:20.

In copolymer (PEDEK-PEEK), the sum of the amount of recurring units ($R_{PEDEK}$) and ($R_{PEEK}$) is generally of at least 70% moles, preferably at least 80% moles, even more preferably at least 90% moles, and most preferably at least 95% moles, with respect to the total number of moles of recurring units.

The copolymer (PEDEK-PEEK) may additionally comprise recurring units ($R_{PAEK}$) different from recurring units ($R_{PEEK}$) and ($R_{PEDEK}$), as above detailed. In such case, the amount of recurring units ($R_{PAEK}$) is generally comprised between 0 and 5% moles, with respect to the total number of moles of recurring units of copolymer (PEDEK-PEEK), while recurring units ($R_{PEEK}$) and ($R_{PEDEK}$) will be present in an amount of at least 95% moles, with respect to the total number of moles of recurring units of copolymer (PEDEK-PEEK).

When recurring units ($R_{PAEK}$) different from recurring units ($R_{PEEK}$) and ($R_{PEDEK}$) are present in the copolymer (PEDEK-PEEK), these recurring units ($R_{PAEK}$) generally comply with any of the following formulae (K-A) to (K-M) herein below:

(K-A)

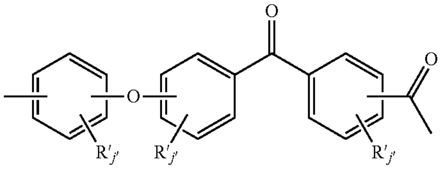

(K-B)

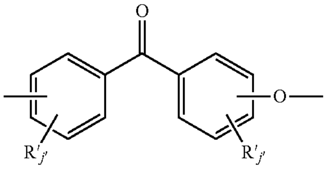

(K-C)

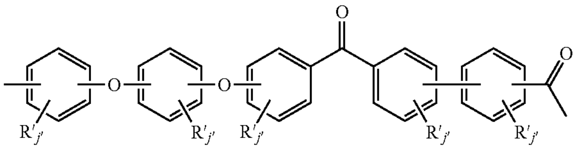

(K-D)

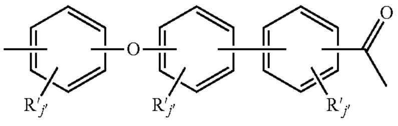

(K-E)

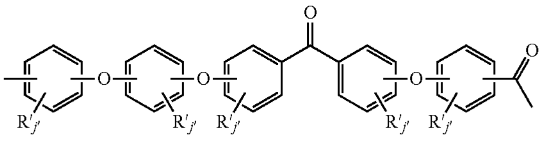

(K-F)

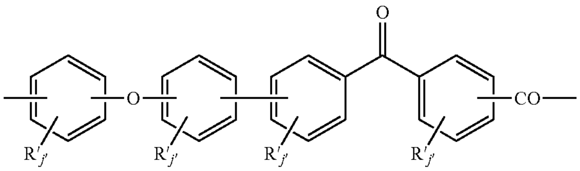

(K-G)

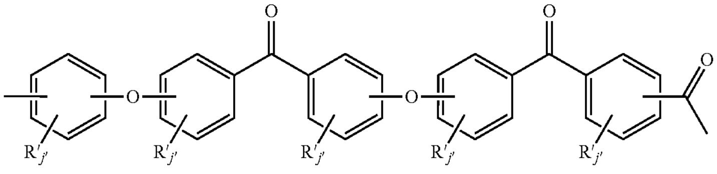

-continued (K-H)

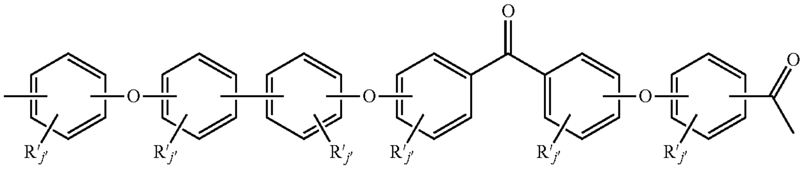

(K-I)

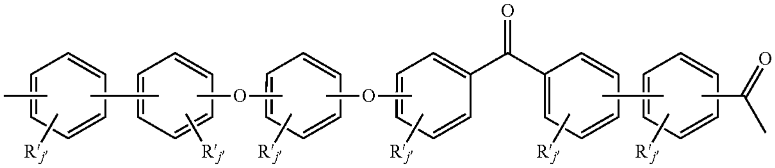

(K-J)

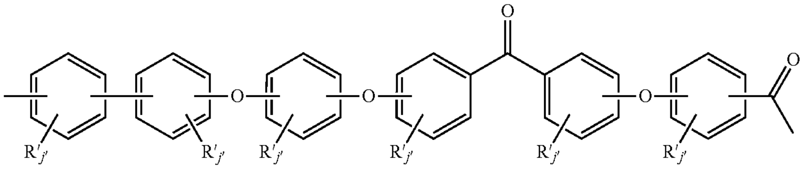

(K-K)

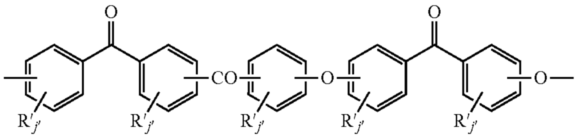

(K-L)

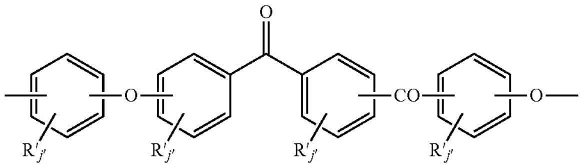

(K-M)

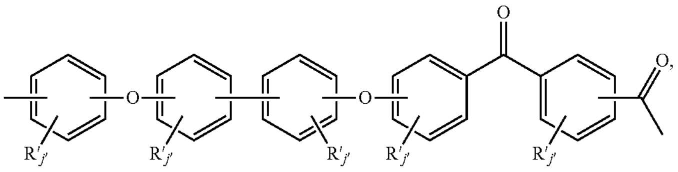

wherein in each of formulae (K-A) to (K-M) above, each of R', equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; and each of j', equal to or different from each other, is independently selected at each occurrence from 0 and an integer of 1 to 4, preferably j' being equal to zero.

It is nevertheless generally preferred for the copolymer (PEDEK-PEEK) to be essentially composed of recurring units ($R_{PEEK}$) and ($R_{PEDEK}$), as above detailed. The expression "essentially composed of", in connection with copolymer (PEDEK-PEEK) is meant to indicate that defects, end groups and monomers' impurities may be incorporated in very minor amounts in the copolymer (PEDEK-PEEK), so as to advantageously not affect negatively the performances of the same in the inventive blend.

In recurring units ($R_{PEEK}$) of formula (I), the connections among phenyl groups are generally in the para positions of each of the phenyl rings. Further, it is generally preferred for each of j' to be zero, or in other words, for each of the phenyl rings not to bear any further substituents in addition to the catenary ethereal or ketone bridging groups. According to these preferred embodiments, recurring units ($R_{PEEK}$) comply with formula (Ia):

Formula (Ia)

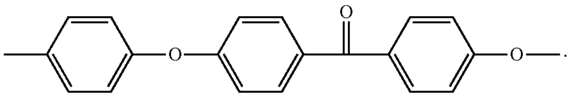

Similarly, in recurring units ($R_{PEDEK}$) of formula (II), the connections among phenyl groups are generally in the para positions of each of the phenyl rings. Further, it is generally preferred for each of k" to be zero, or in other words, for each of the phenyl rings not to bear any further substituents in addition to the catenary ethereal or ketone bridging groups. According to these preferred embodiments, recurring units ($R_{PEDEK}$) comply with formula (IIb):

Formula (IIb)

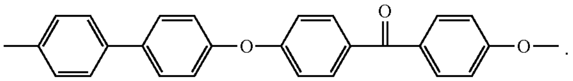

Polyphenylsulfone Polymer [Polymer (PPSU)]

As said, the polyphenylsulfone polymer [polymer (PPSU)] comprises more than 50 mol %, with respect to all recurring units, of recurring units ($R_{PPSU}$) of formula (P-1):

(P-1)

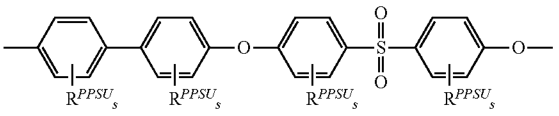

as described above.

Preferably each d in formula (P-1) is zero. In other terms, recurring units ($R_{PPSU}$) of polymer (PPSU) preferably are units of formula:

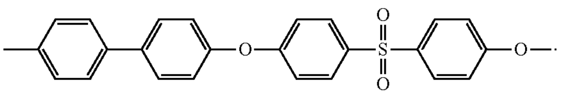

Polymer (PPSU) may comprise less than 50% moles of recurring units different from recurring units ($R_{PPSU}$), as detailed above.

In particular, polymer (PPSU) may comprise recurring units ($R_{PAES}$), different from the above mentioned recurring units ($R_{PPSU}$), complying with formula (P-3):

$$—Ar^1\text{-}(T'\text{-}Ar^2)_n—O—Ar^3—SO_2—[Ar^4\text{-}(T\text{-}Ar^2)_n—SO_2]_m—Ar^5—O— \quad \text{(P-3)}$$

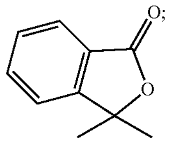

n and m, equal to or different from each other, are independently zero or an integer of 1 to 5, Preferably, in formula (P-2), T is selected from the group consisting of a bond, $—CH_2—$, $—C(O)—$, $—C(CH_3)_2—$, $—C(CF_3)_2—$, $—C({=}CCl_2)—$, $—C(CH_3)(CH_2CH_2COOH)—$, and a group of formula:

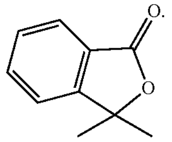

Recurring units ($R_{PAES}$) can be notably selected from the group consisting of those of formulae (S-A) to (S-D) herein below, different from recurring units ($R_{PPSU}$):

(S-A)

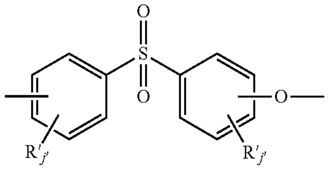

(S-B)

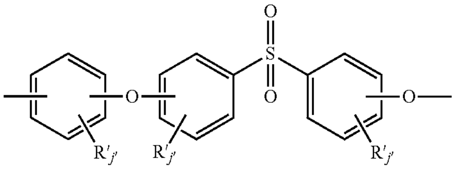

(S-C)

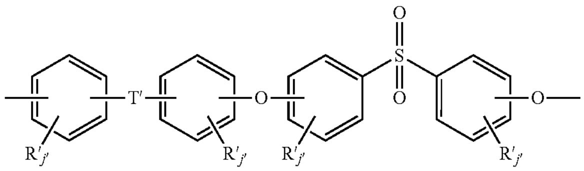

(S-D)

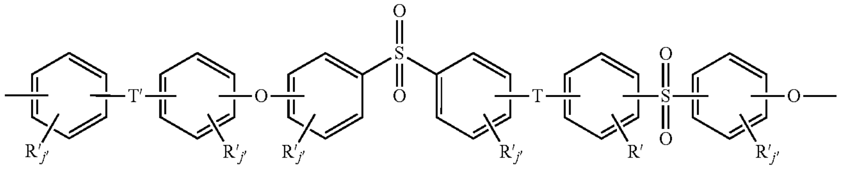

wherein:

$Ar^1$, $Ar^2$, $Ar^3$, $Ar^4$, and $Ar^5$, equal to or different from each other and at each occurrence, are independently an aromatic, substituted or unsubstituted, mono- or polynuclear group;

each T and T', equal to or different from each other and at each occurrence, is independently a bond or a divalent group optionally comprising one or more than one heteroatom; preferably T' is selected from the group consisting of a bond, $—CH_2—$, $—C(O)—$, $—C(CH_3)_2—$, $—C(CF_3)_2—$, $—C({=}CCl_2)—$, $—SO_2—$, $—C(CH_3)(CH_2CH_2COOH)—$, and a group of formula:

wherein:

each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each of j', equal to or different from each other, is independently zero or is an integer from 1 to 4;

T and T', equal to or different from each other are a bond or a divalent group optionally comprising one or more than one heteroatom; preferably T' is selected from the group consisting of a bond, $-CH_2-$, $-C(O)-$, $-C(CH_3)_2-$, $-C(CF_3)_2-$, $-C(=CCl_2)-$, $-C(CH_3)(CH_2CH_2COOH)-$, $-SO_2-$, and a group of formula:

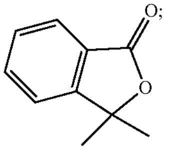

preferably T is selected from the group consisting of a bond, $-CH_2-$, $-C(O)-$, $-C(CH_3)_2-$, $-C(CF_3)_2-$, $-C(=CCl_2)-$, $-C(CH_3)(CH_2CH_2COOH)-$, and a group of formula:

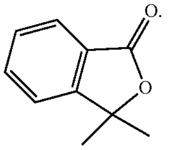

Recurring units ($R_{PAES}$) may be selected from the group consisting of the recurring units of formulas (i) to (iv) and (j) to (j) detailed below:

(i)

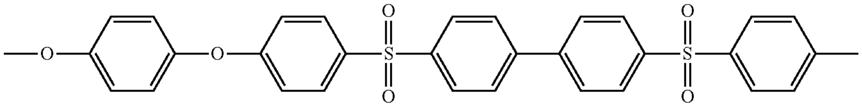

(ii)

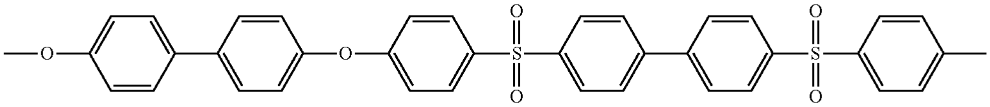

(iii)

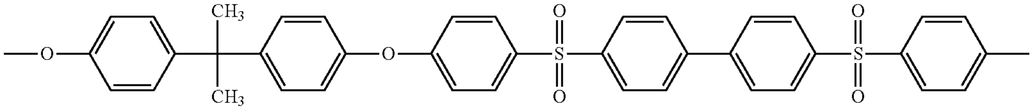

(iv)

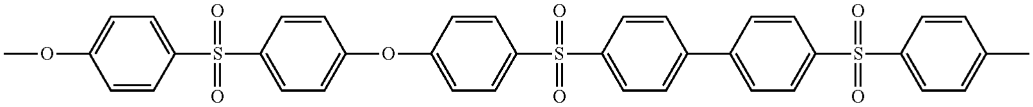

(j)

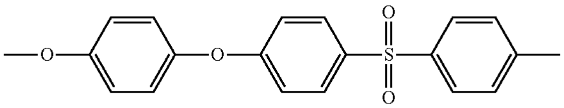

(jj)

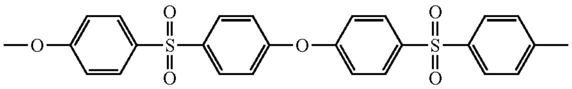

(jjj)

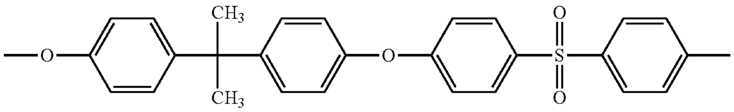

and mixtures thereof.

Preferably at least 60% moles, more preferably at least 70% moles, still more preferably at least 80% moles and most preferably at least 90% moles of the recurring units of polymer (PPSU) are recurring units ($R_{PPSU}$), as described above Excellent results were obtained when the polymer (PPSU) contained essentially no recurring unit other than recurring units ($R_{PPSU}$); a representative example of polymer (PPSU) is notably RADEL® PPSU commercially available from Solvay Specialty Polymers USA, L.L.C.

Polyethersulfone Polymer [Polymer (PESU)]

As said, the polyethersulfone polymer [polymer (PESU)] comprises more than 50 mol %, with respect to all recurring units, of recurring units ($R_{PESU}$) of formula (P-2):

(P-2)

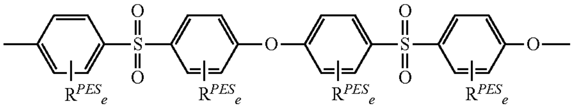

as described above.

Preferably each e in formula (P-2) is zero. In other terms, recurring units ($R_{PESU}$) of polymer (PESU) preferably are units of formula:

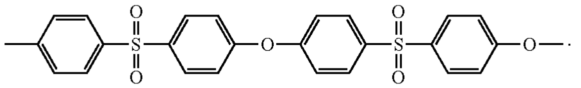

Polymer (PESU) may comprise less than 50% moles of recurring units different from recurring units ($R_{PESU}$), as detailed above.

In particular, polymer (PESU) may comprise recurring units ($R_{PAES}$), different from the above mentioned recurring units ($R_{PESU}$), complying with formula (P-3):

$$—Ar^1-(T'-Ar^2)_n—O—Ar^3—SO_2—[Ar^4-(T-Ar^2)_n—SO_2]_m—Ar^5—O— \quad (P-3)$$

as detailed above.

Recurring units ($R_{PAES}$) can be notably selected from the group consisting of those of formulae (S-A) to (S-D) as already detailed above, different from recurring units ($R_{PESU}$)

Recurring units ($R_{PAES}$) may be selected from the group consisting of the recurring units of formulas (i) to (iv) and (j), (jjj) and (jv):

Composition Comprising the Copolymer (PEDEK-PEEK) and the Polymer

The composition (C) comprises at least one copolymer (PEDEK-PEEK): it may comprise one or more than one copolymer (PEDEK-PEEK), e.g. a multiplicity of copolymers (PEDEK-PEEK) which may differ because of their respective molecular weight (RV, MV . . . ), or because of the nature of their recurring units, or for whichever other parameter, including combinations thereof.

The composition (C) comprises at least one polymer (SP) selected from the group consisting of polymers (PPSU) and polymers (PESU), as detailed above, that is to say composition (C) may comprise only one polymer (SP), which may be a polymer (PPSU) or a polymer (PESU), as described above, or may comprise a plurality of polymers, each of which may be independently selected from polymers (PPSU) and polymers (PESU), e.g. a plurality of polymers (PPSU), a plurality of polymers (PESU) or a combination of one or more than one polymer (PPSU) and one or more than one polymer (PESU).

In certain embodiments, the composition (C) comprises at least one polymer (PPSU): it may comprise one or more than (i)

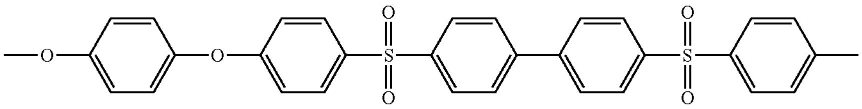

(ii)

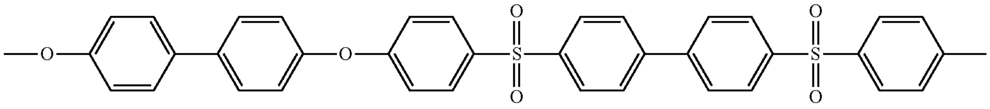

(iii)

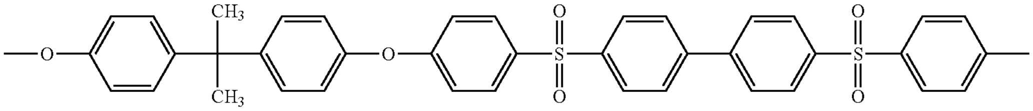

(iv)

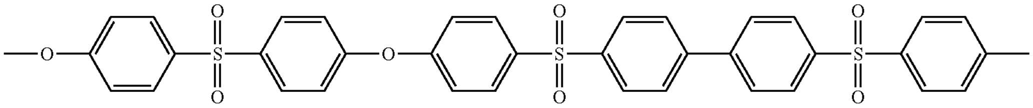

(j)

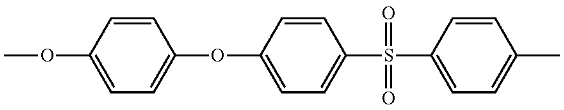

(jjj)

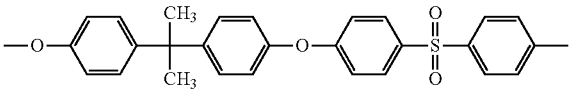

(jv)

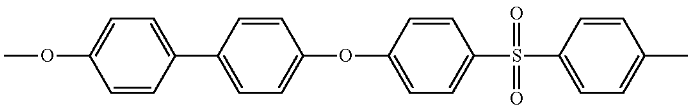

and mixtures thereof.

Preferably at least 60% moles, more preferably at least 70% moles, still more preferably at least 80% moles and most preferably at least 90% moles of the recurring units of polymer (PESU) are recurring units ($R_{PESU}$), as described above Excellent results were obtained when the polymer (PESU) contained essentially no recurring unit other than recurring units ($R_{PESU}$); a representative example of polymer (PESU) is notably VERADEL® PESU commercially available from Solvay Specialty Polymers USA, L.L.C.

one polymer (PPSU), e.g. a multiplicity of polymers (PPSU) which may differ because of their respective molecular weight (RV, MV . . . ), or because of the nature of their recurring units, or for whichever other parameter, including combinations thereof.

In certain other embodiments, the composition (C) comprises at least one polymer (PESU): it may comprise one or more than one polymer (PESU), e.g. a multiplicity of polymers (PESU) which may differ because of their respective molecular weight (RV, MV . . . ), or because of the nature of their recurring units, or for whichever other parameter, including combinations thereof.

The composition (C) may comprise copolymer (PEDEK-PEEK) and polymer (SP) in weight ratios of 5/95 to 95/5, or preferably in weight ratios of 10/90 to 90/10.

Depending upon the intended field of use, the weight ratio between copolymer (PEDEK-PEEK) and polymer (SP) may be adjusted, considering that beneficial effects of the invention, e.g. synergistic enhancement of properties, may be achieved throughout the entire range of compositions.

For instance, polymer (SP) may be present in a weight amount of at least 10%, at least 20%, at least 30% or even at least 35%, based on the combined weight of the copolymer (PEDEK-PEEK) and polymer (SP).

Conversely, composition (C) may comprise polymer (SP), as above detailed, in a weight amount of less than 90%, less than 70%, less than 60% or less than 50%, based on the combined weight of the copolymer (PEDEK-PEEK) and polymer (SP).

According to other preferred embodiments, the composition (C) comprises the copolymer (PEDEK-PEEK) and polymer (SP), as above detailed, in a combined weight amount of at least 90%, if not at least 95%, based on the total weight of the said composition (C). Yet, embodiments are provided wherein the composition (C) consists essentially of the copolymer (PEDEK-PEEK) and polymer (SP), as above detailed. For the purpose of the present invention, the expression "consisting essentially of" is to be understood to mean that any additional component different from the copolymer (PEDEK-PEEK) and polymer (SP), as above detailed, is present in an amount of at most 1% by weight, based on the total weight of the composition (C), so as not to substantially alter advantageous properties of the composition.

Nevertheless, the composition (C) is often formulated with additional ingredients beside copolymer (PEDEK-PEEK) and polymer (SP).

The composition (C) may, for instance, further comprise at least one reinforcing filler. Reinforcing fillers are well known by the skilled in the art. They are preferably selected from fibrous and particulate fillers. Fibrous fillers may be added to the composition (C) as chopped fibers or as continuous fibers, including under the form of fabrics.

More preferably, the reinforcing filler is selected from mineral fillers (such as talc, mica, kaolin, calcium carbonate, calcium silicate, magnesium carbonate, boron nitride), glass fibers, carbon fibers, synthetic polymeric fiber, aramid fiber, aluminum fiber, titanium fibers, magnesium fibers, boron carbidefibers, rock wool fibers, steel fibers, wollastonite etc. Still more preferably, it is selected from mica, kaolin, calcium silicate, magnesium carbonate, glass fibers, carbon fibers and wollastonite etc.

Preferably, the filler is chosen from fibrous fillers. A particular class of fibrous fillers consists of whiskers, i.e. single crystal fibers made from various raw materials, such as $Al_2O_3$, SiC, BC, Fe and Ni.

In one embodiment of the present invention the reinforcing filler is chosen from wollastonite and glass fibers. Among fibrous fillers, glass fibers are preferred; they include chopped strand A-, E-, C-, D-, S-, T- and R-glass fibers, as described in chapter 5.2.3, p. 43-48 of Additives for Plastics Handbook, 2$^{nd}$ edition, John Murphy.

Glass fibers optionally comprised in polymer composition (C) may have a circular cross-section or a non-circular cross-section (such as an oval or rectangular cross-section).

When the glass fibers used have a circular cross-section, they preferably have an average glass fiber diameter of 3 to 30 μm and particularly preferred of 5 to 12 μm. Different sorts of glass fibers with a circular cross-section are available on the market depending on the type of the glass from which they are made. One may notably cite glass fibers made from E- or S-glass.

Good results were obtained with standard E-glass material with a non-circular cross section. Excellent results were obtained when reinforcing the polymer composition with S-glass fibers with a round cross-section and, in particular, when using round cross-section fibers with a 6 μm diameter (E-Glass or S-glass).

In another embodiment of the present invention the reinforcing filler is a carbon fiber.

As used herein, the term "carbon fiber" is intended to include graphitized, partially graphitized and ungraphitized carbon reinforcing fibers or a mixture thereof. Carbon fibers useful for the present invention can advantageously be obtained by heat treatment and pyrolysis of different polymer precursors such as, for example, rayon, polyacrylonitrile (PAN), aromatic polyamide or phenolic resin; carbon fibers useful for the present invention may also be obtained from pitchy materials. The term "graphite fiber" intends to denote carbon fibers obtained by high temperature pyrolysis (over 2000° C.) of carbon fibers, wherein the carbon atoms place in a way similar to the graphite structure. Carbon fibers useful for the present invention are preferably chosen from the group composed of PAN-based carbon fibers, pitch based carbon fibers, graphite fibers, and mixtures thereof.

The weight of said reinforcing filler is advantageously below 60% wt., more preferably below 50% wt., even more preferably below 45% wt., most preferably below 35% wt., based on the total weight of the composition (C).

Preferably, the reinforcing filler is present in an amount ranging from 10 to 60% wt., preferably from 20 to 50% wt., preferably from 25 to 45% wt., most preferably from 25 to 35% wt., based on the total weight of the composition (C).

The reinforcing filler can also be a nanomaterial such as single-walled or multi-walled carbon nanotubes, carbon nanofibers, graphene, a nanoclay such as montmorillonite, or any other nanofiller known in the art.

The composition (C) may further optionally comprise one or more than one additional ingredient (I) different from the reinforcing filler and from the copolymer (PEDEK-PEEK) and polymer (SP), as above detailed, generally selected from the group consisting of (i) colorants such as notably a dye (ii) pigments such as notably titanium dioxide, zinc sulfide and zinc oxide (iii) light stabilizers, e.g. UV stabilizers (iv) heat stabilizers (v) antioxidants such as notably organic phosphites and phosphonites, (vi) acid scavengers (vii) processing aids (viii) crystallization nucleating agents (ix) internal lubricants and/or external lubricants (x) flame retardants (xi) smoke-suppressing agents (x) anti-static agents (xi) anti-blocking agents (xii) conductivity additives such as notably carbon black and carbon nanofibrils (xiii) plasticizers (xiv) flow modifiers (xv) extenders (xvi) metal deactivators and combinations comprising one or more of the foregoing additives.

When one or more than one additional ingredient (I) are present, their total weight, based on the total weight of polymer composition (C), is usually below 20%, preferably below 10%, more preferably below 5% and even more preferably below 2%.

According to certain embodiments, the composition (C) may comprise the copolymer (PEDEK-PEEK) and polymer (SP), as above detailed, in combination with one or more than one additional polymeric components, such as polyarylether polymers different from copolymer (PEDEK-PEEK), including e.g. PEEK, PEK, PEKK; polyaryl sulphides, and the like.

It is nevertheless understood that the composition (C) is typically a composition based on copolymer (PEDEK-PEEK) and polymer (SP); generally speaking, this means that the combined weight of copolymer (PEDEK-PEEK) and polymer (SP) exceed the weight amount of any other polymer component, which may possibly be comprised therein.

According to other embodiments, the copolymer (PEDEK-PEEK) and polymer (SP), as above detailed, are the only polymeric components in the composition (C).

The expression 'polymeric components' is to be understood according to its usual meaning, i.e. encompassing compounds characterized by repeated linked units, having typically a molecular weight of 2000 or more.

According to certain embodiments, polymer (SP) is a polymer (PPSU) and composition (C) may comprise said polymer (PPSU) in a weight amount of at least 10%, at least 20%, at least 30% or even at least 35%, based on the combined weight of the copolymer (PEDEK-PEEK) and polymer (PPSU). In these embodiments, composition (C) may comprise polymer (PPSU), as above detailed, in a weight amount of less than 90%, less than 70%, less than 60% or less than 50%, based on the combined weight of the copolymer (PEDEK-PEEK) and polymer (PPSU). All features described above in connection with composition (C) comprising polymer (SP) and copolymer (PEDEK-PEEK) are equally attributes of the embodiments hereby referred, whereas polymer (SP) is a polymer (PPSU). A particularly advantageous embodiment resides in a composition (C) comprising copolymer (PEDEK-PEEK) in an amount of 60 to 90% and polymer (PPSU) in an amount of 10 to 40%, based on the combined weight of the copolymer (PEDEK-PEEK) and polymer (PPSU).

According to other embodiments, polymer (SP) is a polymer (PESU) and composition (C) may comprise said polymer (PESU) in a weight amount of at least 10%, at least 20%, at least 30% or even at least 35%, based on the combined weight of the copolymer (PEDEK-PEEK) and polymer (PESU). In these embodiments, composition (C) may comprise polymer (PESU), as above detailed, in a weight amount of less than 90%, less than 70%, less than 60% or less than 50%, based on the combined weight of the copolymer (PEDEK-PEEK) and polymer (PESU). All features described above in connection with composition (C) comprising polymer (SP) and copolymer (PEDEK-PEEK) are equally attributes of the embodiments hereby referred, whereas polymer (SP) is a polymer (PESU). Another particularly advantageous embodiment resides in a composition (C) comprising copolymer (PEDEK-PEEK) in an amount of 60 to 90% and polymer (PESU) in an amount of 10 to 40%, based on the combined weight of the copolymer (PEDEK-PEEK) and polymer (PESU).

The composition (C) can be prepared by a variety of methods involving intimate admixing of the at least one copolymer (PEDEK-PEEK), at least one polymer (SP), as above detailed, optionally the reinforcing filler and optionally additional ingredient (I) desired in the polymeric material, for example by dry blending, suspension mixing, slurry mixing, solution mixing, melt mixing and any combination thereof, in particular a combination of dry blending and melt mixing.

Typically, the dry blending of copolymer (PEDEK-PEEK) and polymer (SP), as detailed above, preferably in powder state, optionally the reinforcing filler and optionally additional ingredient (I) is carried out by using high intensity mixers, such as notably Henschel-type mixers and ribbon mixers so as to obtain a physical mixture, in particular a powder mixture of the at least one copolymer (PEDEK-PEEK) and the at least one polymer (SP), optionally the reinforcing filler and optionally additional ingredient (I).

Alternatively, the intimate admixing of the at least one copolymer (PEDEK-PEEK), the at least one polymer (SP), optionally the reinforcing filler and optionally additional ingredient (I) desired in the composition (C), is carried out by tumble blending based on a single axis or multi-axis rotating mechanism so as to obtain a physical mixture.

Alternatively, the slurry mixing of the copolymer (PEDEK-PEEK), the at least one polymer (SP), optionally the reinforcing filler and optionally additional ingredient (I) is carried out by first slurrying said copolymer (PEDEK-PEEK), and said polymer (SP) as above detailed, in powder form, optionally the reinforcing filler and optionally additional ingredient (I) using an agitator in an appropriate liquid such as for example methanol, followed by filtering the liquid away, so as to obtain a powder mixture of the at least one copolymer (PEDEK-PEEK), the at least one polymer (SP), optionally the reinforcing filler and optionally additional ingredient (I).

In another embodiment, the solution mixing of the copolymer (PEDEK-PEEK), the polymer (SP), as detailed above, optionally the reinforcing filler and optionally additional ingredient (I) using an agitator in an appropriate solvent or solvent blends such as for example diphenyl sulfone, benzophenone, 4-chlorophenol, 2-chlorophenol, meta-cresol. Diphenyl sulfone and 4-chlorophenol are most preferred.

Following the physical mixing step by one of the aforementioned techniques, the physical mixture, in particular the obtained powder mixture, of the at least one copolymer (PEDEK-PEEK), the at least one polymer (SP), optionally the reinforcing filler and optionally additional ingredient (I) is typically melt fabricated by known methods in the art including notably melt fabrication processes such as compression molding, injection molding, extrusion and the like, to provide shaped articles, including notably part(s) of an oil and gas recovery article or a finished oil and gas recovery article, as explained below in more detail.

So obtained physical mixture, in particular the obtained powder mixture, can comprise the copolymer (PEDEK-PEEK), the polymer (SP), the reinforcing filler, as detailed above, and optionally, other ingredients (I) in the weight ratios as above detailed, or can be a concentrated mixture to be used as masterbatch and diluted in further amounts of the copolymer (PEDEK-PEEK) and polymer (SP), as above detailed, the reinforcing filler, as detailed above, and optionally, other ingredients (I) in subsequent processing steps. For example, the obtained physical mixture can be extruded into a stock shape like a slab or rod from which a final part can be machined. Alternatively, the physical mixture can be compression or injection molded into a finished part of the oil and gas recovery article or into a stock shape from which a finished part of the oil and gas recovery article can be machined.

It is also possible to manufacture the composition of the invention by melt compounding. Composition (C) may be manufactured by further melt compounding the powder mixture as above described. As an alternative, melt compounding may be effected directly on the copolymer (PEDEK-PEEK), polymer (SP), as above detailed, the reinforcing filler, as detailed above, and optionally, other ingredients (I). In such case, copolymer (PEDEK-PEEK) and polymer (SP) may be provided in the form of pellets or in the form of powders to be fed to the melt compounding device, with pellets being the preferred form for the sake of ensuring stable feeding. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

If desired, the design of the compounding screw, e.g. flight pitch and width, clearance, length as well as operating conditions will be advantageously chosen so that sufficient heat and mechanical energy is provided to advantageously fully melt the mixture (e.g. the preformed powder mixture) or the ingredients as above detailed and advantageously obtain a homogeneous distribution of the different ingredients. Provided that optimum mixing is achieved between the bulk polymer and filler contents, it is advantageously possible to obtain strand extrudates of the composition (C) of the invention. Strand extrudates of the composition (C) can be chopped by means e.g. of a rotating cutting knife after some cooling time on a conveyer with water spray. Thus, composition (C) may be provided in the form of pellets or beads, which can then be further used for the manufacture of shaped articles, notably of different shape and size, through different processing techniques.

Composition (C) may be further provided under the form of powders (e.g. by comminuting, milling and/or classifying) or of filaments (e.g. manufactured by extrusion), for use in additive manufacturing, e.g. for being processed by selected laser sintering or fused filament fabrication.

In some embodiments, composition (C) may be used for making composite materials, including a polymer matrix made of composition (C) and a plurality of fibres embedded therein. Composite materials including a matrix of composition (C) may be provided in the form of substantially bidimensional materials, e.g., materials having one dimension (thickness or height) that is significantly smaller than the other two dimensions (width and length), such as sheets and tapes. In certain preferred embodiments, the composite material comprising a matrix of composition (C) is selected from the group consisting of:

- composite materials comprising one or more than one ply of impregnated fabrics, including but not limited to non-woven fabrics such as mats, multiaxial fabrics, woven fabrics or braided fabrics; and
- unidirectional (continuous or discontinuous) fiber reinforced tapes or prepregs, preferably where the fibers are aligned; and
- multi-directional fiber reinforced tapes or prepregs comprising multiple layers of fiber-reinforced tapes or prepregs.

Fabrics and fibers used in the composite materials above described may be of any type; it is nevertheless preferred to use carbon fabrics and fibers, in particular for providing continuous carbon fiber unidirectional tapes.

Shaped Articles

Another object of the present invention is a shaped article comprising the composition (C) as above detailed.

The composition (C), as above detailed, can be processed by usual melt processing techniques, including notably extrusion molding, injection molding, and compression molding, so as to provide shaped articles.

The shaped article of the invention is preferably selected from the group consisting of (i) an extruded shape, preferably selected from the group consisting of a rod, a slab, a tubing, a pipe or a profile; and (ii) an injection molded article.

According to certain embodiments shaped articles are under the form of substantially bidimensional articles, e.g. parts wherein one dimension (thickness or height) is significantly less than the other two characterizing dimensions (width and length), such as notably films, sheaths and sheets.

According to other embodiments, shaped articles are provided as three-dimensional parts, e.g. substantially extending in the three dimensions of space in similar manner, including under the form of parts with complex geometries, e.g. with concave or convex sections, possibly including undercuts, inserts, and the like.

Potential applications include various industrial and durable components in automotive, aerospace, semiconductor fabrication, including as electrostatic dissipative (ESD) components for semi-conductors and IC chip manufacturing, electrical-electronics, wire and cable insulation, high performance films, medical and pharmaceutical components.

According to certain embodiments, shaped articles made from the composition (C), as above detailed, are provided as part(s) of an electrostatic discharge (ESD) protective device, which may, e.g., be designed for being connected to a semiconductor wafer intended for chip manufacture.

According to certain embodiments, shaped articles made from the composition (C), as above detailed, are provided as part(s) of oil and gas recovery article(s).

Use of the Copolymer (PEDEK-PEEK) in O&G

The invention further pertains to a method of making parts included in devices used for oil & gas recovery, including shaping those parts from the composition (C). Shaping can be achieved through any melt processing technique, including notably extrusion molding, injection molding, compression molding, and the like.

An oil and gas recovery article including at least one part made from a composition (C), as above detailed, is still another object of the present invention.

To the purposes of the invention, the term “oil and gas recovery article” is intended to denote any article that is designed to conveniently be used in oil and gas recovery applications, in particular in high pressure (HP)/high temperature (HT) conditions.

For the sake of clarity, the term “part of an oil and gas recovery article” is intended to denote a piece or portion which is combined with others to make up the whole oil and gas recovery article. The external coating of an oil and gas recovery article falls thus within this scope. Thus, the at least one part of the oil and gas recovery article according to the present invention can be a coating.

Representative examples of oil and gas recovery applications, but not limited to, include (i) drilling and completion of deep, higher temperature, higher pressure oil and gas wells, as notably described in U.S. Pat. No. 5,662,170 the entire disclosure of those are incorporated herein by reference, (ii) an oil and gas recovery method as traditionally subdivided in three stages, namely a primary oil recovery stage, a secondary or assisted oil recovery and a tertiary or enhanced oil recovery stage (iii) gas and oil gathering treatment applications, (iv) complex transportation of gas and oil from said deep, higher temperature, higher pressure wells to refineries and the like.

All these applications as herein mentioned above, are well familiar to the skilled person, and should be understood under their common meaning.

As non-limitative examples of oil and gas recovery articles useful in the present invention are drilling systems; drilling rigs; compressor systems, as notably described in published U.S. Pat. Appl. US 2010239441, the entire disclosure of which is incorporated herein by reference; pumping systems; motor systems, sensors, such as reservoir sensors; control systems, such as temperature and/or pressure; stimulation and flow control systems; liner hanger systems, as notably described in U.S. Pat. No. 6,655,456, the entire disclosure of which is incorporated herein by reference; packer systems, as notably described in U.S. Pat. No. 7,874,356, the entire disclosure of which is incorporated herein by reference; pipe systems, valve systems, tubing systems, casing systems, and others.

All these systems as herein mentioned above, are well familiar to the skilled person, and should be understood under their common meaning.

By the term "drilling rig" is meant a structural housing equipment that is used to drill oil wells, or natural gas extraction wells, and may comprise a single article or comprise two or more components. Typically components of said drilling rig include, but not limited to, mud tanks, shale shakers, mud pumps, drill pipes, drill bits, drilling lines, and electric cable trays.

As non-limitative examples of pumping systems useful in the present invention are jet pump systems, submersible pumping systems, in particular electric submersible pumps, as notably described in U.S. Pat. No. 6,863,124 the entire disclosure of which is incorporated herein by reference, and beam pumps.

As non-limitative examples of motor systems useful in the present invention are mud motor assemblies, as notably described in U.S. Pat. No. US 2012234603, the entire disclosure of which is incorporated herein by reference.

As non-limitative examples of pipe systems useful in the present invention, mention can be made of pipes including rigid pipes and flexible pipes, flexible risers, pipe-in-pipe, pipe liners, subsea jumpers, spools, and umbilicals.

Typical flexible pipes have been described by way of example in WO 01/61232, U.S. Pat. Nos. 6,123,114 and 6,085,799; the entire disclosure of those are incorporated herein by reference. Such flexible pipes can notably be used for the transport of fluids where very high or very different water pressure prevails over the length of the pipe, and for example can take the form of flexible risers which run from the ocean floor up to equipment at or in the vicinity of the ocean surface, and they can also generally be used as pipes for the transport of liquids or gases between various items of equipment, or as pipes laid at great depth on the ocean floor, or as pipes between items of equipment close to the ocean surface, and the like.

Preferred pipe systems are pipes, flexible risers and pipe liners.

By the term "valves" is meant any device for halting or controlling the flow of a liquid, gas, or any other material through a passage, pipe, inlet, outlet, and the like. As non-limitative examples of valve systems useful in the present invention, mention can especially be made of choke valves, thermal expansion valves, check valves, ball valve, butterfly valve, diaphragm valve, gate valve, globe valve, knife valve, needle valve, pinch valve, piston valve, plug valve, poppet valve, spool valve, pressure reducing valve, sampling valves, and safety valve.

The at least one part of the oil and gas recovery articles according to the present invention may be selected from a large list of articles such as fitting parts; such as seals, in particular sealing rings, preferably backup seal rings, fasteners and the like; snap fit parts; mutually moveable parts; functional elements, operating elements; tracking elements; adjustment elements; carrier elements; frame elements; films; switches; connectors; wires, cables; bearings, housings, compressor components such as compressor valves and compressor plates, and any other structural part other than housings as used in an oil and gas recovery articles, such as for example shafts, shells, and pistons.

In particular, the composition (C) is very well suited for the production of seals, fasteners, cables, electrical connectors, and housing parts of oil and gas recovery articles.

In one preferred embodiment, the at least one part of the oil and gas recovery article according to the present invention is advantageously an oil and gas recovery housing, a seal, an electrical connector or a cable.

A cable can be notably wires electrically connecting the different parts within an oil and gas recovery article, for example connecting different electrical connectors, connecting tools to connectors, instruments or other tools, connecting instruments to connectors, other instruments or tools, or connecting a power source to connectors, instruments or tools. A cable can also advantageously be used for carrying a signal to computer systems.

In a particularly preferred embodiment, the cable is a coated wire.

By "oil and gas recovery housing" is meant one or more of the back cover, front cover, frame and/or backbone of an oil and gas recovery article. The housing may be a single article or comprise two or more components. By "backbone" is meant a structural component onto which other components of the oil and gas recovery article are mounted. The backbone may be an interior component that is not visible or only partially visible from the exterior of the oil and gas recovery article.

Typical fasteners have been described by way of example in WO 2010/112435, the entire disclosure of those are incorporated herein by reference, and include, but not limited to, threaded fasteners such as bolts, nuts, screws, headless set screws, scrivets, threaded studs and threaded bushings, and unthreaded fastener, such as notably pins, retaining rings, rivets, brackets and fastening washers and the like.

Sealing of components of oil and gas recovery articles is important and it can be said that seals are used in all types of oil and gas recovery articles, as well as those used in parts of oil and gas recovery articles which remain in the well after completion, testing and production of the well. Thus the seals need to resist to these extreme conditions, as mentioned above, for substantially indefinite time. It is worthwhile mentioning that seals besides electronics can be considered as the most vulnerable parts of oil and gas recovery articles.

In one embodiment of the present invention, the at least part of an oil and gas recovery article is a seal system, wherein said seal system is selected from a group consisting of a metal seal, an elastomeric seal, a metal-to-metal seal and an elastomeric and metal-to-metal seal.

Seal systems are typically used in drill bits, motor systems, in particular mud motors, reservoir sensors, stimulation and flow control systems, pump systems, in particular electric submersible pumps, packers, liner hangers, tubings, casings and the like.

Representative examples of seal systems, are, without limitation, seal rings such as notably C-rings, E-rings, O-rings, U-rings, spring energized C-rings, backup rings and the like; fastener seals; piston seals, gask-O-seals; integral seals, and labyrinth seals.

In a particularly preferred embodiment, the at least one part of the oil and gas recovery article according to the present invention, is a seal ring, preferably a backup seal ring.

The weight of the composition (C), based on the total weight of oil and gas recovery article, is usually above 1%, above 5%, above 10%, preferably above 15%, above 20%, above 30%, above 40%, above 50%, above 60%, above 70%, above 80%, above 90%, above 95%, above 99%.

The oil and gas recovery article may consist of one part, i.e. it is a single-component article. Then, the single part preferably consists of the composition (C).

Alternatively, the oil and gas recovery article may consist of several parts. The case being, either one part or several parts of the oil and gas recovery article may consist of the composition (C). When several parts of the oil and gas recovery article consist of composition (C), each of them may consist of the very same composition (C); alternatively, at least two of them may consist of different compositions (C).

Another objective of the present invention is to provide a method for the manufacture of the above described part of the oil and gas recovery article. Such method is not specifically limited. The composition (C), as above detailed, may be generally processed by injection molding, extrusion molding, compression molding, or other shaping technologies.

In one embodiment of the present invention, the method for the manufacture of the above described part of the oil and gas recovery article or oil and gas recovery article includes the step of compression molding or injection molding and subsequent solidification of the composition (C).

In another embodiment, the method for the manufacture of the above described part of the oil and gas recovery article or oil and gas recovery article includes the step of coating.

For example, the composition (C) can be applied to a wire as a coating by using any suitable coating method, preferably by extrusion coating around a wire to form a coated wire.

Techniques for manufacturing wire coatings are well known in the art.

In another embodiment of the present invention, the method for the manufacture of the above described part of the oil and gas recovery article or the oil and gas recovery article, as described above includes the machining of a standard shaped structural part in a part having any type of size and shape. Non limiting examples of said standard shaped structural part include notably a plate, a rod, a slab and the like. Said standard shaped structural parts can be obtained by extrusion molding, compression molding or injection molding of composition (C).

Method of Recovering Oil and/or Gas Using the Copolymer (PEDEK-PEEK)

According to another aspect of the present invention, it is hereby provided a method for recovering oil and/or gas including using at least one oil and gas recovery article as defined above.

The method of the invention is advantageously a method for recovering oil and/or gas from a subterranean formation including using said oil and gas recovery article.

The subterranean formations can be advantageously deeply buried reservoir, wherein temperatures close to 300 C at a depth of more than 6,000 meters and pressures of over 1,500 bar can be encountered: the said oil and gas articles of the invention possess all the requisites and properties for being qualified to withstand this below-ground inferno over long periods of time.

The method of the invention may advantageously comprise at least one of the operations selected from the group consisting of:

1. drilling at least one borehole for exploring or exploiting an oil and/or gas reservoir in a subterranean formation using at least one oil and gas recovery article as defined above;
2. completing at least one well using at least one oil and gas recovery article as defined above;
3. transporting oil and/or gas from an oil and/or gas reservoir in a subterranean formation to the ground level.

The operation of drilling boreholes for exploring or exploiting oil and/or natural gas reservoirs generally includes the use of drilling rig equipment, which is an embodiment of the oil and gas recovery article as defined above.

FIG. 1 schematically depicts drilling rig equipment. In this equipment a drill pipe or string (#5) acts as a conduit for a drilling fluid; it is generally made of joints of hollow tubing connected together and stood in the derrick vertically. A drill bit (#7) device is attached to the end of the drill string; this bit breaks apart the rock being drilled. It also contains jets through which the drilling fluid exits. The rotary table (#6) or a top drive (not shown) rotates the drill string along with the attached tools and bit.

A mechanical section or draw-works section (#13) contains the spool, whose main function is to reel in/out the drill line to raise/lower the travelling block.

A mud pump (#11) is used to circulate drilling fluid through the system; the mud is suctioned from the mud tank or mud pit (#9) which provides a reserve store of drilling fluid. The mud flows through the conduit #14 and through the drill pipe (#5) down to the bit (#7). Loaded with drill cuttings it flows upwards in the borehole and is extracted through the conduit (#12) back to the mud pit. A shale shaker (#10) separates drill cuttings from the drilling fluid before it is pumped back down the borehole.

The equipment can further comprise devices installed at the wellhead to prevent fluids and gases from unintentionally escaping from the borehole (not shown).

Any of the components of the drilling rig as above detailed may be an oil and gas recovery article, as above detailed, i.e. may comprise at least a part comprising or made from the composition (C), as above defined.

The operation 2. of completing a well is the operation comprehensive of all the preparation or outfitting operations required for bringing in operations a geologic formation from the wellbore. This principally involves preparing the bottom of the hole to the required specifications, running in the production tubing and its associated down hole tools and controlling devices as well as perforating and stimulating as required. Sometimes, the process of running in and cementing the casing is also included. In all these single operations, articles comprising at least one part comprising the composition (C), as above detailed, can be used.

Should the disclosure of any patents, patent applications, and publications which are incorporated herein by reference conflict with the description of the present application to the extent that it may render a term unclear, the present description shall take precedence.

The invention will be now be described with reference to the following examples, whose purpose is merely illustrative and not intended to limit the scope of the present invention.

EXAMPLES

Materials Used

The copolymer (PEDEK-PEEK) used in these examples was a copolymer derived from the polycondensation of 4,4'-difluorobenzophenone (DFBP), 4,4'-dihydroxydiphenyl, also known as biphenol, and hydroquinone. The copolymer is rich in biphenol residue moieties relative to hydroquinone moieties within the total stoichiometric amount of the biphenol in the polymerization. PEDEK represents the polymer repeating unit from the polycondensation of biphenol with 4,4'-difluorobenzophenone. While copolymers (PEDEK-PEEK) that can be used in the practice of this invention can vary in the molar proportion of the PEDEK and PEEK repeat units within the polymer backbone, in the examples a copolymer possessing a PEDEK/PEEK mole ratio of 75-25 (PEDEK-PEEK copolymer, hereinafter) has been used. Said PEDEK-PEEK copolymer has a melt viscosity of 400 Pa·s at 420° C. and 1000 $s^{-1}$ as measured using a capillary rheometer according to ASTM D3835.

Analogous PEEK-rich PEEK-PEDEK copolymers, rich in PEEK repeat units relative to PEDEK repeat units, were also used for comparative examples. Said PEEK-rich PEEK-PEDEK copolymers (PEEK-PEDEK copolymers, hereafter) used in the comparative examples below have PEEK/PEDEK mole ratios of 70-30 and 80-20 and melt viscosities of 200 Pa·s and 190 Pa·s, respectively, at 370° C. and 1000 $s^{-1}$ as measured using a capillary rheometer according to ASTM D3835.

The polymer (PPSU) used was Radel® R-5100 NT PPSU natural resin from Solvay Specialty Polymers USA, LLC. This is a standard grade of PPSU for general purpose extrusion and injection molding applications. It has a melt flow rate range of 14-20 g/10 min as measured using a melt index apparatus according to ASTM D1238 at 365° C. and using a 5.0 kg weight.

The polymer (PESU) used was Veradel® A-201 NT PESU natural resin from Solvay Specialty Polymers USA, LLC. This is a standard grade of PESU for general purpose extrusion and injection molding applications. It has a melt flow rate range of 15-25 g/10 min as measured using a melt index apparatus according to ASTM D1238 at 380° C. and using a 2.16 kg weight.

The polymer (PSU) used for comparative examples was Udel® P-1700 NT PSU natural resin from Solvay Specialty Polymers USA, LLC. This is a standard grade of PSU for general purpose extrusion and injection molding applications. It has a melt flow rate range of 5-9 g/10 min as measured using a melt index apparatus according to ASTM D1238 at 343° C. and using a 2.16 kg weight.

The PEEK polymer used for comparative examples was KetaSpire® KT-820 NT PEEK natural resin from Solvay Specialty Polymers USA, LLC.

This is a standard grade of PEEK for general purpose extrusion and injection molding applications. It has a melt viscosity in the range of 380-500 Pa·s at 400° C. and 1000 $s^{-1}$ as measured using a capillary rheometer according to ASTM D3835.

Preparation of Formulations

The polymer blends according to this invention were prepared by melt compounding using a 26 mm Coperion® co-rotating partially intermeshing twin screw extruder having an L/D ratio of 48:1. The extruder had 12 barrel sections with barrel sections 2 through 12 being heated with a temperature setting of 390° C. The die temperature was also set at 390° C. The extruder was operated at a throughput rate of 30 lb/hr and 200 rpm screw speed, and the extruder torque reading was maintained in the 50-70% range during compounding of all the compositions. Vacuum venting with a vacuum level>25 in Hg was applied at barrel section 10 during compounding to strip off moisture and any possible residual volatiles from the compound. The extrudate from each of the runs was stranded and cooled in a water trough and then pelletized into pellets approximately 2.7 mm in diameter and 3.0 mm in length.

Testing of Formulations

Mechanical properties were tested for all the formulations using injection molded 0.125 in (3.2 mm) thick ASTM test specimens, which consisted of 1) Type I tensile bars, 2) 5 in×0.5 in×0.125 in flexural bars, and 3) 4 in×4 in×0.125 in plaques for the instrumented impact (Dynatup) testing. The control and comparative example formulations were also injection molded into the same test specimens. With the exception of neat PPSU, PESU, and PSU specimens, injection molded test specimens were annealed in an oven prior to testing. The annealing conditions used were 230° C. for 2 hours, except for annealing of injection molded specimens from blend compositions that included PSU, for which annealing conditions of 200° C. for 2 hours were used in order to prevent warpage of the test specimens. The molded parts were annealed between two flat 0.5 inch thickness glass plates.

The following ASTM test methods were employed in evaluating all compositions:

ASTM D638: Tensile properties (testing speed=2.0 in/min);

ASTM D790: Flexural properties;

ASTM D3763: Instrumented impact resistance also known by the name Dynatup impact.

Melt viscosity was evaluated by capillary rheometry according to ASTM D3835 using a temperature of 400° C., except for comparative compositions including PEEK-rich PEEK-PEDEK copolymer, for which a temperature of 370° C. was used.

Dynamic Mechanical Analysis (DMA) was also conducted in torsion mode on injection molded test specimens (cut from the center of an ASTM Type I tensile bar). Dynamic temperature sweeps from 50° C. to 350° C. were performed at a frequency of 10.0 rad/s and a strain amplitude of 0.05%.

Table 1 summarizes mechanical and thermal properties of exemplary formulations of this invention.

TABLE 1

| | C1 | E1 | E2 | E3 | E4 | E5 | E6 | E7 | C2 | C3 |
|---|---|---|---|---|---|---|---|---|---|---|
| 75-25 PEDEK-PEEK Copolymer (w %) | 100 | 80 | 60 | 50 | 40 | 20 | 60 | 40 | 0 | 0 |
| Radel ® R-5100 NT PPSU (w %) | 0 | 20 | 40 | 50 | 60 | 80 | 0 | 0 | 100 | 0 |
| Veradel ® A-201 NT PESU | | | | | | | 40 | 60 | | 100 |
| Tests | | | | | | | | | | |
| Tensile Strength, ambient (psi) | 13800 | 13200 | 12800 | 12300 | 12300 | 11400 | 13600 | 13700 | 11000 | 13300 |
| Tensile Modulus, ambient (kpsi) | 501 | 459 | 426 | 402 | 393 | 342 | 446 | 425 | 339 | 400 |
| Tensile Elongation at Break, ambient (%) | 21 | 38 | 53 | 65 | 71 | 83 | 64 | 55 | 59 | 55 |
| Dynatup - Peak Energy (ft · lbf) | 56.9 | 60.2 | 59.3 | 58.3 | 58.2 | 53.9 | N/A | N/A | 51.9 | N/A |
| Tensile Strength at 160° C. (psi) | 4410 | 5810 | 5870 | 5960 | 5820 | 6300 | 6230 | 7450 | 6280 | 8130 |

TABLE 1-continued

| | C1 | E1 | E2 | E3 | E4 | E5 | E6 | E7 | C2 | C3 |
|---|---|---|---|---|---|---|---|---|---|---|
| Tensile Modulus at 160° C. (kpsi) | 392 | 380 | 345 | 329 | 285 | 288 | 360 | 334 | 315 | 375 |
| Tensile Elongation at Yield at 160° C. (%) | 2.2 | 2.2 | 3.5 | 3.4 | 3.7 | 3.4 | 3.9 | 3.6 | 3.2 | 3.6 |
| Flexural Strength at 160° C. (psi) | 7440 | 8660 | 8560 | 8540 | 9180 | 8510 | 10500 | 11000 | 8580 | 7170 |
| Flexural Modulus at 160° C. (kpsi) | 320 | 357 | 321 | 322 | 312 | 260 | 371 | 354 | 284 | 328 |
| Tg1 from DMA (° C.) | 178.4 | 181.1 | 180.6 | 180.3 | 180.2 | 180.2 | 181.9 | 176.1 | — | — |
| Tg2 from DMA (° C.) | — | 222.9 | 221.2 | 221.0 | 221.9 | 222.7 | 232.0 | 232.1 | 226.0 | 233.4 |

The ductility of the PEDEK-PEEK copolymers at ambient conditions, as indicated by the tensile elongation at break data in Table 1, is significantly enhanced by the addition of either PPSU or PESU. The ductility of the polymer blends according to the invention is substantially greater than what would be predicted from a linear weighted average of the two components. This improvement in ductility is achieved without sacrificing strength or stiffness, as the ambient tensile strength and tensile modulus are observed to trend linearly with the concentration ratio of the blend.

The tensile elongation at break data for representative working examples and controls including neat PPSU are presented in FIG. 1.

The impact energy of the blends of PEDEK-PEEK copolymer with PPSU, as indicated by the peak load energy of the Dynatup measurements in Table 1, is also significantly enhanced compared to the neat resin controls.

Figure 4:
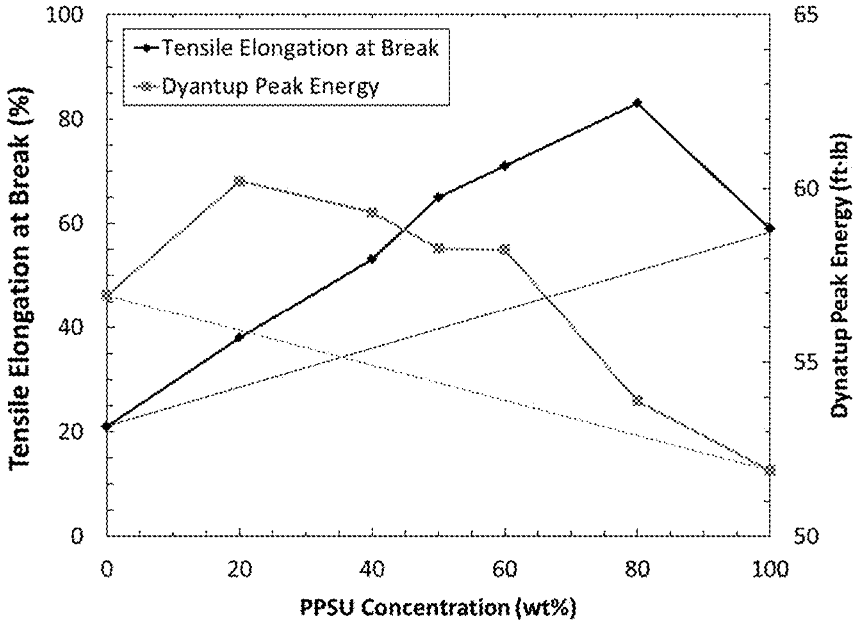
FIG. 4 depicts the trends of tensile elongation at break and Dynatup impact resistance for blend compositions prepared according to this invention. (Data in Table 1)
Figure 5:
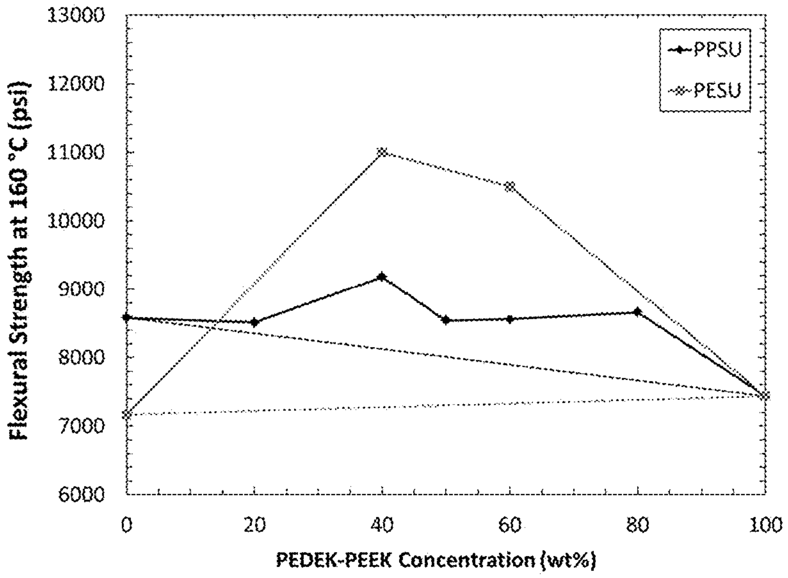
FIG. 5 depicts the trend of flexural strength at high temperature for blend compositions prepared according to this invention. (Data in Table 1)

The measured values are all above what would be predicted from a linear weighted average of the two components. The tensile elongation at break and Dynatup impact data for the working examples and controls are presented in FIG. 4 and the Flexural strength data are presented in FIG. 5.

Addition of PPSU or PESU to the PEDEK-PEEK copolymer also improves the high temperature mechanical properties. The tensile and flexural data at 160° C. in Table 1 show that for blends of PEDEK-PEEK copolymer with PPSU at 160° C., the tensile strength at yield and the elongation at yield, as well as the flexural strength, lie above what would be predicted from a linear weighted average of the two components (see FIGS. 4 and 5). These improvements in strength and ductility over the range of PPSU concentrations are achieved without significant reductions in the tensile and flexural modulus at 160° C. compared to the linear weighted average of the two components.

Further, DMA measurements on polymer blends according to the invention have shown that inventive compositions exhibit two distinct glass transition temperatures (Tg) throughout the entire range of PEDEK-PEEK to either PPSU or PESU weight ratios, as shown in Table 1. Furthermore, for the blends with PPSU, the higher Tg that corresponds with the PPSU-rich phase, shifts to lower values as the concentration of PEDEK-PEEK copolymer increases, going from 226° C. for neat PPSU to about 221-223° C. for blends with PPSU which are rich in PEDEK-PEEK copolymer, and from 233.4° C. for neat PESU to 232.0° C. for blends with PESU which are rich in PEDEK-PEEK copolymer. This combination of behavior indicates that the blends are partially miscible, which is a surprising and beneficial result. Unlike a fully miscible blend, which would be expected to exhibit a single Tg corresponding to a weighted average of the two components, the partially miscible blend retains the higher Tg of the sulfone polymer-rich phase. Additionally, a partially miscible blend is understood to be easier to process than a completely immiscible blend, which may be challenging to process or may exhibit phase separation during melt processing that can undermine the mechanical properties of molded parts.

Table 2 summarizes mechanical and thermal properties of comparative examples that includes PSU as the sulfone polymer in the blend.

TABLE 2

| | C1 | CE1 | CE2 | CE3 |
|---|---|---|---|---|
| 75-25 PEDEK-PEEK Copolymer | 100 | 60 | 40 | 0 |
| UDEL ® P-1700 NT 11 PSU | 0 | 40 | 60 | 100 |
| Tests | | | | |
| Tensile Strength, ambient (psi) | 13800 | 12700 | 11900 | 11000 |
| Tensile Modulus, ambient (kpsi) | 501 | 435 | 403 | 372 |
| Tensile Elongation at Break, ambient (%) | 21 | 86 | 97 | 99 |
| Tensile Strength at 160° C. (psi) | 4410 | 5420 | 5690 | 5960 |
| Tensile Modulus at 160° C. (kpsi) | 392 | 325 | 333 | 359 |
| Tensile Elongation at Yield at 160° C. (%) | 2.2 | 2.8 | 2.7 | 2.7 |
| Flexural Strength at 160° C. (psi) | 7440 | 8520 | 7710 | 12100 |
| Flexural Modulus at 160° C. (kpsi) | 320 | 357 | 328 | 373 |
| Tg1 from DMA (° C.) | 178.4 | — | — | — |
| Tg2 from DMA (° C.) | — | 191.8 | 189.7 | 193.5 |

Figure 6:
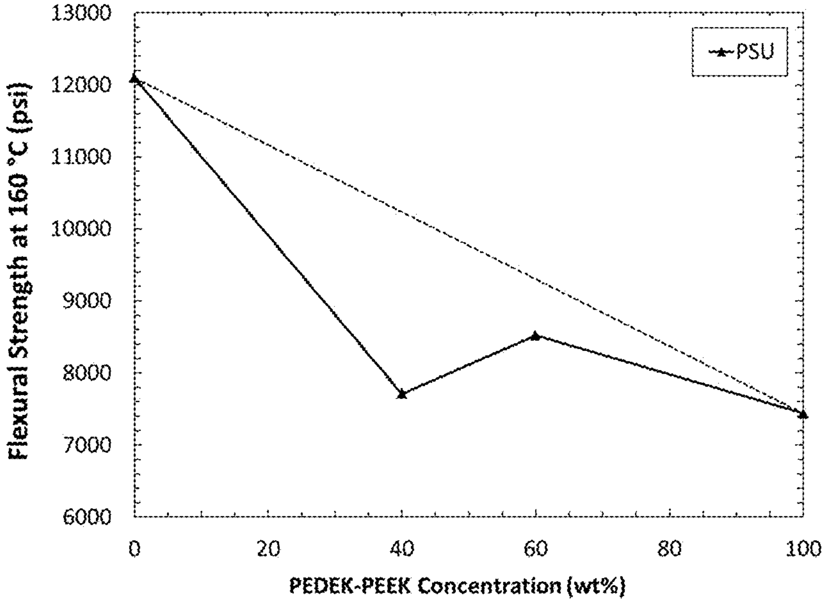
FIG. 6 depicts the trend of flexural strength at high temperature for comparative blend compositions including PSU as sulfone polymer. (Data in Table 2)
Figure 7:
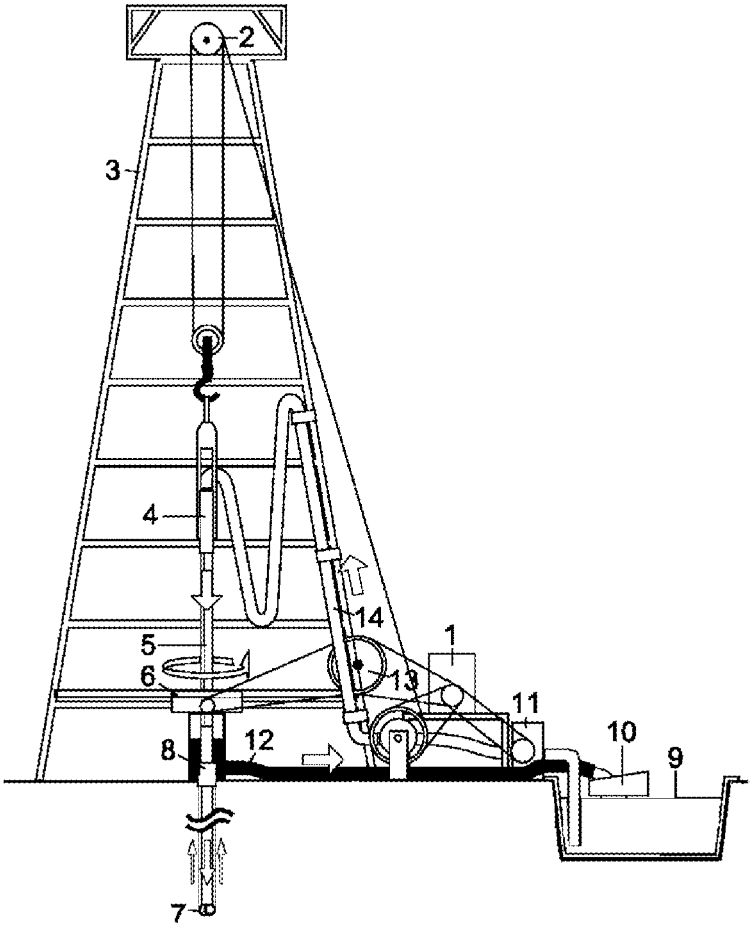
FIG. 7 schematically depicts a drilling rig equipment.

The data in Table 2 show that, in contrast to the blends exemplary of the invention, addition of PSU to the PEDEK-PEEK copolymer does not improve high temperature mechanical properties beyond what would be predicted from a linear weighted average of the two components. As an example, the flexural strength at 160° C. as a function of the amount of PEDEK-PEEK copolymer in the blend with PSU is shown in FIG. 6.

Table 3 summarizes mechanical and thermal properties of comparative examples of blends of PPSU with PEEK-Rich PEEK-PEDEK copolymers.

TABLE 3

| | CE4 | CE5 | CE6 | CE7 | CE8 | CE9 |
|---|---|---|---|---|---|---|
| 80-20 PEEK-PEDEK Copolymer | 100 | 60 | 40 | 0 | 0 | 0 |
| 70-30 PEEK-PEDEK Copolymer | 0 | 0 | 0 | 100 | 60 | 40 |
| Radel ® 5100 NT PPSU | 0 | 40 | 60 | 0 | 40 | 60 |
| Tests | | | | | | |
| Tensile Strength, ambient (psi) | 14700 | 13400 | 12900 | 14300 | 13200 | 12800 |
| Tensile Modulus, ambient (kpsi) | 518 | 439 | 401 | 495 | 422 | 384 |
| Tensile Elongation at Break, ambient (%) | 16 | 21 | 54 | 13 | 36 | 45 |
| Dynatup - Peak Energy (ft · lbf) | 6.6 | 25 | 51.4 | 45.8 | 43.1 | 51.7 |

Figure 2:
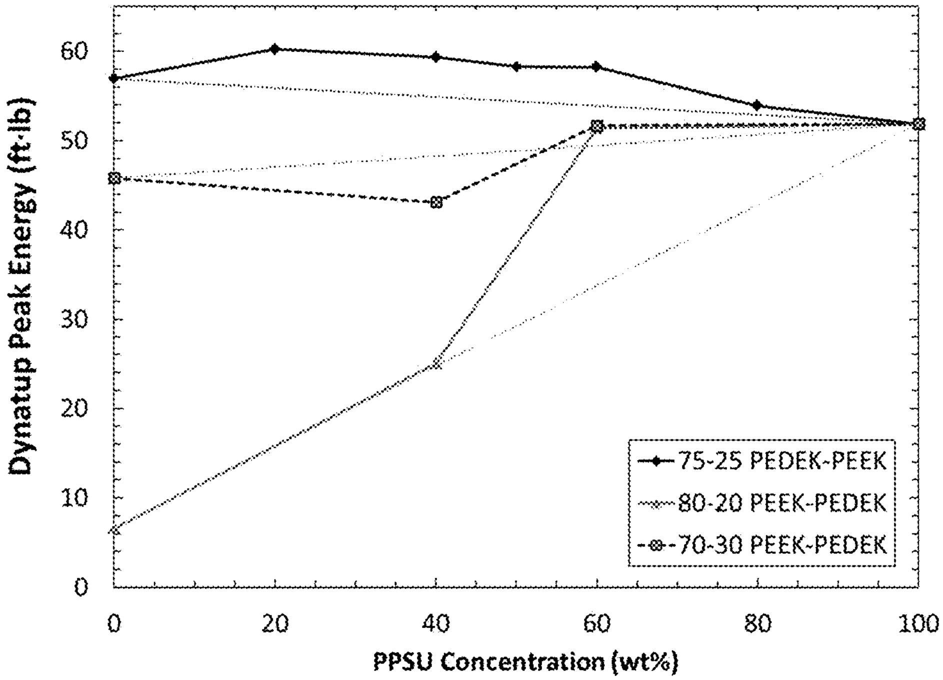
FIG. 2 sketches the Dynatup Peak Energy for representative working example based on PEDEK-rich PEDEK-PEEK copolymer and controls based on PEEK-rich PEEK-PEDEK copolymers, all including same amount of neat PPSU.
Figure 3:
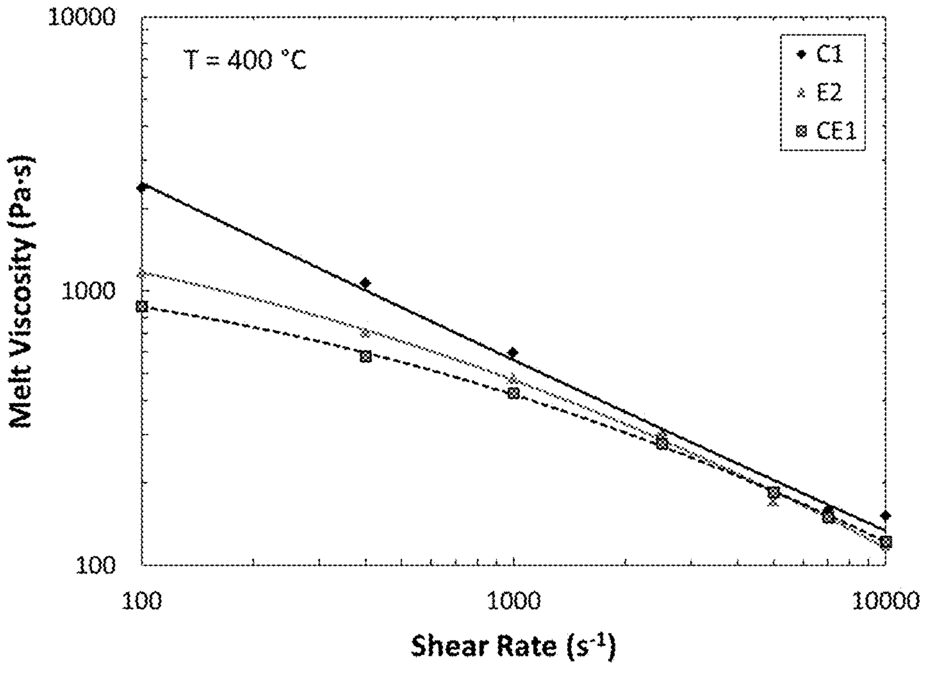
FIG. 3 depicts the trend of melt viscosity as a function of shear rate at 400° C. (data in Table 2). C1 is a neat PEDEK-PEEK copolymer, E2 is a polymer blend according to the invention that is a 40/60 blend of PPSU and PEDEK-PEEK copolymer, and CE1 is a 37/63 blend of PPSU/PEEK. The viscosity of the composition according to the invention is reduced compared to that of the neat PEDEK-PEEK copolymer.

The tensile elongation at break data for the comparative examples in Table 3 is plotted in FIG. 1. Compared to blends according to the invention, blends containing PEEK-rich PEEK-PEDEK copolymers have a lower tensile elongation at break, indicating lower ductility. Furthermore, while the tensile elongation at break for blends according to the invention is substantially greater than what would be predicted from a linear weighted average of the two components, FIG. 1 shows that for the comparative blends containing PEEK-rich PEEK-PEDEK copolymers the tensile elongation at break is much closer to what would be predicted from a linear weighted average of the two components. Also, the impact energy data for the comparative examples in Table 3 is plotted in FIG. 2. Compared to blends according to the invention, blends containing PEEK-rich PEEK-PEDEK copolymers have a lower Dynatup peak load energy. Furthermore, while the Dynatup peak energy for blends according to the invention is substantially greater than what would be predicted from a linear weighted average of the two components, for the comparative blends containing PEEK-rich PEEK-PEDEK copolymers the Dynatup peak energy is either lower or generally much closer to what would be predicted from a linear weighted average of the two components.

Table 4 summarizes melt viscosity data for an exemplary formulation of the invention in comparison with an analogous blend based on PEEK.

TABLE 4

| | C1 | CE10 | E2 |
|---|---|---|---|
| KetaSpire ® KT-820 PEEK (w %) | 0 | 63 | 0 |
| 75-25 PEDEK-PEEK Copolymer (w %) | 100 | 0 | 60 |
| Radel ® R-5100 NT PPSU (w %) | 0 | 37 | 40 |
| Tests | | | |
| Melt Viscosity, 400° C., 100 $s^{-1}$ (Pa · s) | 2377.8 | 882.2 | 1170.2 |
| Melt Viscosity, 400° C., 400 $s^{-1}$ (Pa · s) | 1070.4 | 577.6 | 708.2 |
| Melt Viscosity, 400° C., 1000 $s^{-1}$ (Pa · s) | 596.5 | 424.2 | 480.4 |
| Melt Viscosity, 400° C., 2500 $s^{-1}$ (Pa · s) | 297.5 | 277.7 | 299.7 |
| Melt Viscosity, 400° C., 5000 $s^{-1}$ (Pa · s) | 182.9 | 185.3 | 172.0 |
| Melt Viscosity, 400° C., 7000 $s^{-1}$ (Pa · s) | 158.7 | 149.8 | 149.3 |
| Melt Viscosity, 400° C., 10000 $s^{-1}$ (Pa · s) | 151.7 | 122.6 | 119.2 |

The melt viscosity of polymer blends according to the invention exhibit reduced melt viscosity compared to the neat PEDEK-PEEK copolymer control, as shown in Table 4. This reduction in melt viscosity facilitates easier processing, particularly for injection molding thin-walled parts or for 3-D printing applications. The melt viscosity data in Table 4 shows that the melt viscosity of the polymer blend according to the invention falls between that of the neat PEDEK-PEEK copolymer control and that of an analogous PEEK/PPSU blend with a similar PPSU concentration. See also the plot of melt viscosity vs shear rate in FIG. 1.

Table 5 summarizes melt viscosity data for comparative examples of PPSU blends with PEEK-rich PEEK-PEDEK copolymers.

TABLE 5

| | CE4 | CE5 | CE7 | CE8 |
|---|---|---|---|---|
| 80-20 PEEK-PEDEK Copolymer | 100 | 60 | 0 | 0 |
| 70-30 PEEK-PEDEK Copolymer | 0 | 0 | 100 | 60 |
| Radel ® 5100 NT PPSU | 0 | 40 | 0 | 40 |
| Tests | | | | |
| Melt Viscosity, 370° C., 100 $s^{-1}$ (Pa · s) | 245.3 | 422.5 | 248.7 | 446.4 |
| Melt Viscosity, 370° C., 400 $s^{-1}$ (Pa · s) | 233.1 | 353.4 | 232.5 | 384.9 |
| Melt Viscosity, 370° C., 1,000 $s^{-1}$ (Pa · s) | 187.0 | 281.7 | 202.7 | 306.3 |
| Melt Viscosity, 370° C., 2,500 $s^{-1}$ (Pa · s) | 136.7 | 202.2 | 157.4 | 222.4 |
| Melt Viscosity, 370° C., 5,000 $s^{-1}$ (Pa · s) | 103.0 | 142.3 | 120.1 | 158.6 |
| Melt Viscosity, 370° C., 7,000 $s^{-1}$ (Pa · s) | 88.7 | 118.4 | 104.0 | 130.1 |
| Melt Viscosity, 370° C., 10,000 $s^{-1}$ (Pa · s) | 72.4 | 98.2 | 83.7 | 104.6 |

While Table 4 shows that adding PPSU to PEDEK-PEEK beneficially results in a decrease in the melt viscosity, the data in Table 5 shows that adding PPSU to PEEK-PEDEK copolymers results in an increase in melt viscosity, which is detrimental to processability.

TABLE 6

| | CE4 | CE5 | CE7 | CE8 | CE11 | CE10 | C1 | E2 |
|---|---|---|---|---|---|---|---|---|
| 80-20 PEEK-PEDEK Copolymer | 100 | 60 | 0 | 0 | 0 | 0 | 0 | 0 |
| 70-30 PEEK-PEDEK Copolymer | 0 | 0 | 100 | 60 | 0 | 0 | 0 | 0 |
| KetaSpire ® KT-820 PEEK | 0 | 0 | 0 | 0 | 100 | 63 | 0 | 0 |

TABLE 6-continued

| | CE4 | CE5 | CE7 | CE8 | CE11 | CE10 | C1 | E2 |
|---|---|---|---|---|---|---|---|---|
| 75-25 PEDEK-PEEK Copolymer | 0 | 0 | 0 | 0 | 0 | 0 | 100 | 60 |
| Radel ® 5100 NT PPSU | 0 | 40 | 0 | 40 | 0 | 37 | 0 | 40 |
| Tests | | | | | | | | |
| DMA Storage Modulus, 180° C. (MPa) | 213.7 | 394.3 | 175.4 | 414.5 | 175.9 | 307.6 | 237.6 | 575.9 |
| % variance of SM(180° C.) by sulfone addition | — | 84.6% | — | 136.4% | — | 74.9% | — | 142.4% |
| DMA Storage Modulus, 200° C. (MPa) | 147.3 | 289.3 | 119.9 | 305.0 | 137.3 | 196.7 | 104.9 | 309.0 |
| % variance of SM(200° C.) by sulfone addition | — | 96.4% | — | 154.5% | — | 43.2% | — | 194.7% |

Table 6 summarizes storage modulus data from DMA at elevated temperatures (180° C. and 200° C.) for an exemplary formulation of the invention, in comparison with an analogous blend based on either PEEK or PEEK-rich PEEK-PEDEK copolymers having either 80-20 or 70-30 PEEK/PEDEK repeat units molar ratio.

More particularly, Table 6 shows storage modulus measurements from torsion mode DMA tests at 180° C. and 200° C. The data indicate that the stiffness of a polymer blend according to the invention exceeds that of the neat PEDEK-PEEK copolymer control, as well as that of comparative examples consisting of blends of PPSU with either PEEK or PEEK-rich PEEK-PEDEK copolymers, having either 80/20 or 70-30 mole ratios of PEEK and PEDEK repeat units. Furthermore, the variance in storage modulus caused by the addition of PPSU is a more significant improvement when said PPSU is added to PEDEK-rich PEDEK-PEEK copolymer than when adding the same to PEEK materials or to PEEK-rich PEEK-PEDEK copolymers, and most surprisingly, with beneficial effect increasing in the temperature range of 180 to 200° C., hence delivering most valuable performances enhancement at higher temperature.

The invention claimed is:

1. A composition (C) comprising:

at least one polyaryl ether ketone copolymer, copolymer (PEDEK-PEEK), comprising:

recurring units ($R_{PEEK}$) of formula (I):

Formula (I)

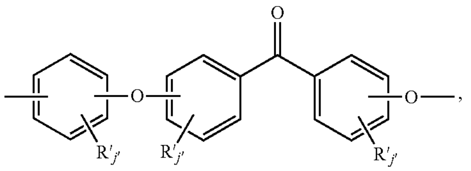

and recurring units ($R_{PEDEK}$) of formula (II):

Formula (II)

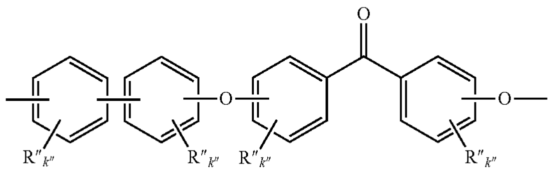

wherein in above formulae (I) and (II), each of R' and R", equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; each of j' and k", equal to or different from each other, is independently selected at each occurrence from 0 and an integer of 1 to 4;

wherein the said recurring units are comprised in a molar ratio ($R_{PEDEK}$):($R_{PEEK}$) of 70:30 to 80:20, and at least one sulfone polymer, polymer (SP), selected from the group consisting of:

(PS-1) polyphenylsulfone polymers, polymer (PPSU), comprising more than 50 mol %, with respect to all recurring units, of recurring units ($R_{PPSU}$) of formula (P-1):

(P-1)

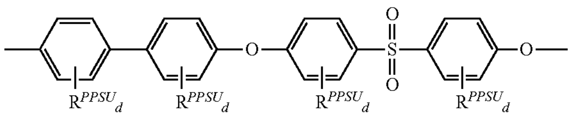

wherein each $R^{PPSU}$, equal to or different from each other at each instance, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each d, equal to or different from each other at each instance, is independently selected from 0, 1, 2, 3 and 4; and (PS-2) polyethersulfone polymers, polymer (PESU), comprising more than 50 mol %, with respect to all recurring units, of recurring units ($R_{PESU}$) of formula (P-2):

(P-2)

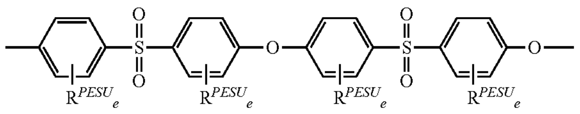

wherein each $R^{PESU}$, equal to or different from each other at each instance, is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each e, equal to or different from each other at each instance, is independently selected from 0, 1, 2, 3 and 4;

wherein said composition (C) comprises copolymer (PEDEK-PEEK) and polymer (SP) in weight ratios of 10/90 to 90/10.

2. The composition of claim 1, wherein copolymer (PEDEK-PEEK) additionally comprises recurring units ($R_{PAEK}$) different from recurring units ($R_{PEEK}$) and ($R_{PEDEK}$), wherein the amount of recurring units ($R_{PAEK}$) is preferably comprised between 0 and 5% moles, with respect to the total number of moles of recurring units of copolymer (PEDEK-PEEK), and/or wherein said recurring units ($R_{PAEK}$) preferably comply with any of the following formulae (K-A) to (K-M) herein below:

(K-A)

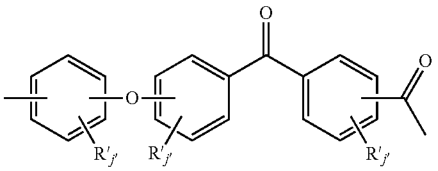

(K-B)

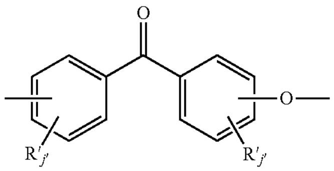

(K-C)

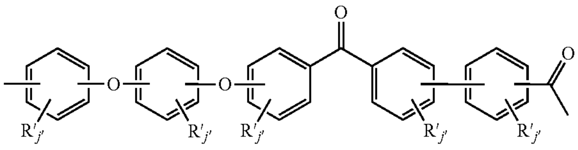

(K-D)

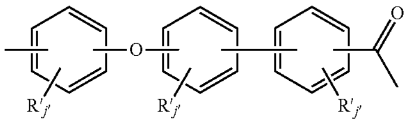

(K-E)

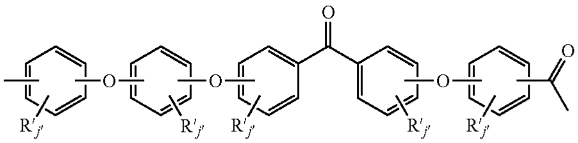

(K-F)

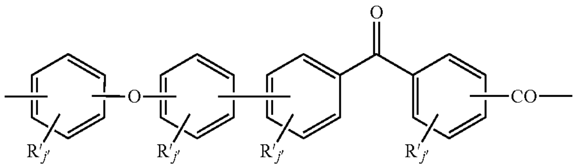

(K-G)

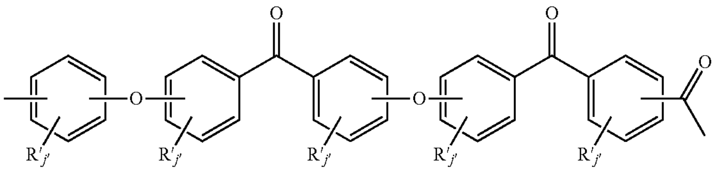

(K-H)

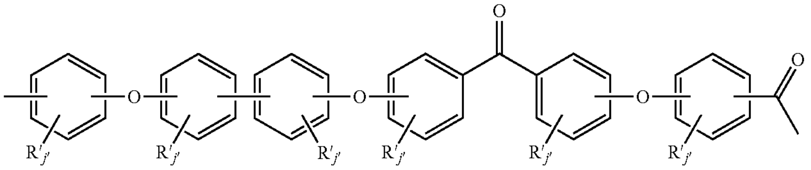

-continued (K-I)

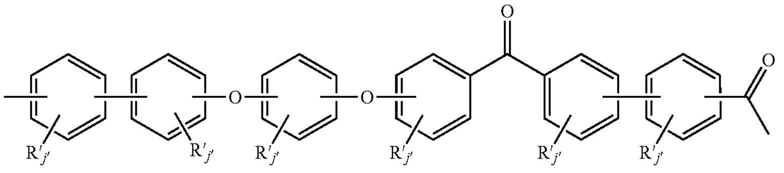

(K-J)

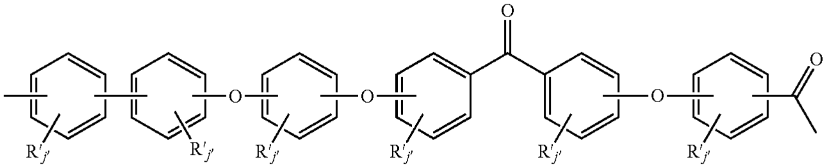

(K-K)

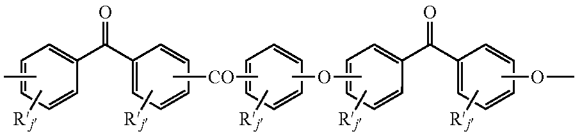

(K-L)

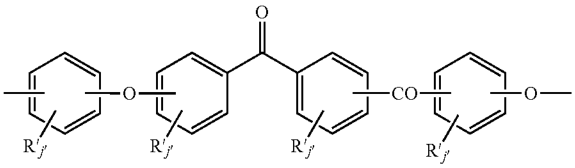

(K-M)

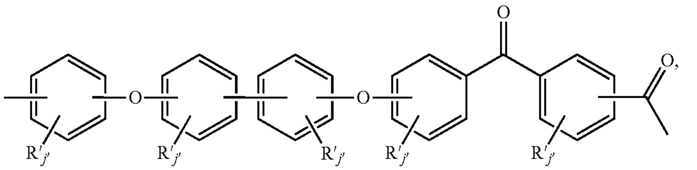

wherein in each of formulae (K-A) to (K-M) above, each of R', equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; and each of j', equal to or different from each other, is independently selected at each occurrence from 0 and an integer of 1 to 4.

3. The composition (C) according to claim 1, wherein in copolymer (PEDEK-PEEK), in recurring units ($R_{PEEK}$) of formula (I), the connections among phenyl groups are generally in the para positions of each of the phenyl rings and/or each of j' is zero, and wherein in recurring units ($R_{PEDEK}$) of formula (II), the connections among phenyl groups are generally in the para positions of each of the phenyl rings and/or each of k" is zero.

4. The composition (C) according to claim 3, wherein recurring units ($R_{PEEK}$) comply with formula (Ia):

Formula (Ia)

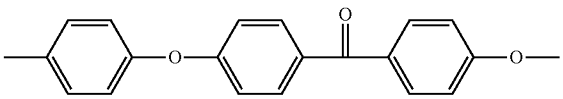

and wherein recurring units ($R_{PEDEK}$) comply with formula (IIb):

Formula (IIb)

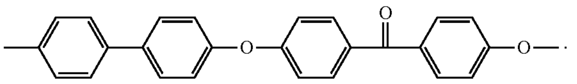

5. The composition according to claim 1, wherein polymer (SP) is at least one polymer (PPSU), wherein recurring units ($R_{PPSU}$) of polymer (PPSU) are units of formula:

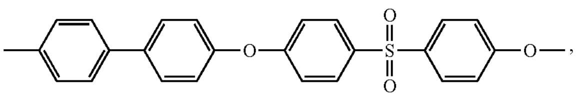

and wherein either polymer (PPSU) contains essentially no recurring unit other than recurring units ($R_{PPSU}$), or wherein polymer (PPSU) comprises less than 50% moles of recurring units ($R_{PAES}$), different from recurring units ($R_{PPSU}$), complying with formula (P-3):

$-Ar^1-(T'-Ar^2)_n-O-Ar^3-SO_2-[Ar^4-(T-Ar^2)_n-SO_2]_m-Ar^5-O-$ (P-3)

wherein:

$Ar^1$, $Ar^2$, $Ar^3$, $Ar^4$, and $Ar^5$, equal to or different from each other and at each occurrence, are independently an aromatic, substituted or unsubstituted, mono- or polynuclear group;

each T and T', equal to or different from each other and at each occurrence, is independently a bond or a divalent group optionally comprising one or more than one heteroatom;

n and m, equal to or different from each other, are independently zero or an integer of 1 to 5.

6. The composition of claim 5, wherein recurring units ($R_{PAES}$) are selected from the group consisting of formulae (S-A) to (S-D), different from recurring units ($R_{PPSU}$) or different from recurring units ($R_{PESU}$):

(S-A)

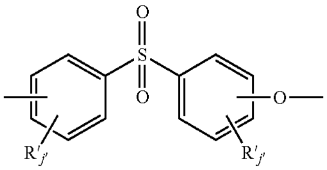

(S-B)

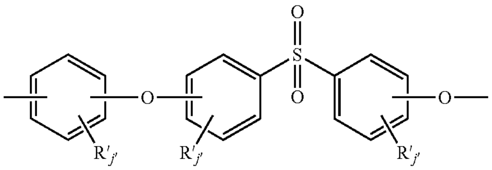

(S-C)

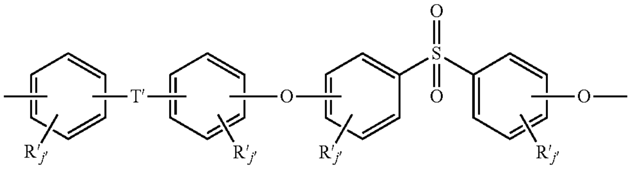

(S-D)

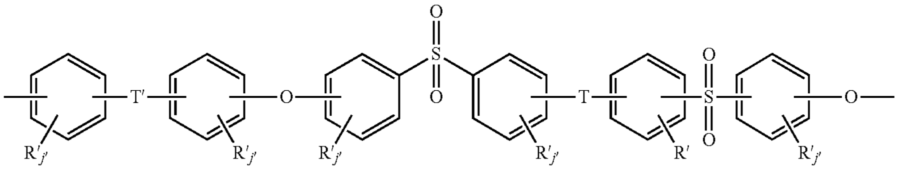

wherein:

each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each of j', equal to or different from each other, is independently zero or is an integer from 1 to 4;

T and T', equal to or different from each other are a bond or a divalent group optionally comprising one or more than one heteroatom; and/or wherein, when polymer (SP) is a polymer (PPSU), recurring units ($R_{PAES}$) are selected from the group consisting of the recurring units of formulas (i) to (iv) and (j) to (jjj); and wherein, when polymer (SP) is a polymer (PESU), recurring units ($R_{PAES}$) are selected from the group consisting of the recurring units of formulas (i) to (iv), (j), (jj) and (jv):

(i)

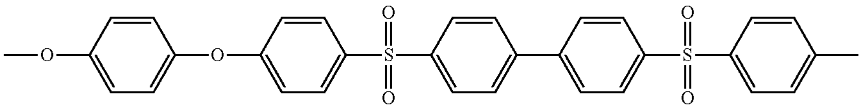

(ii)

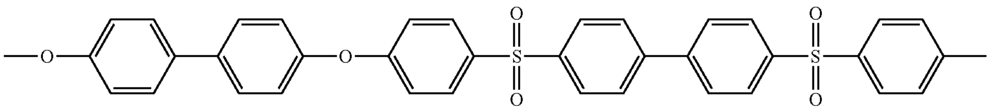

(iii)

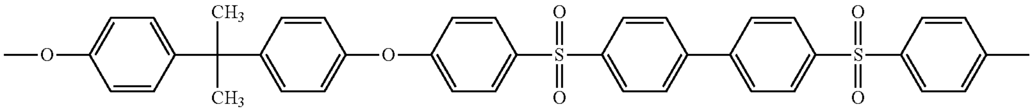

(iv)

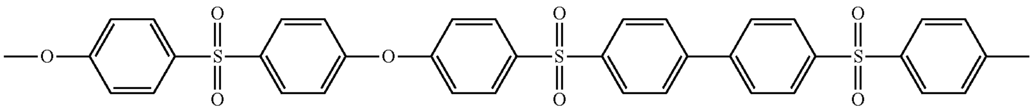

-continued (j)

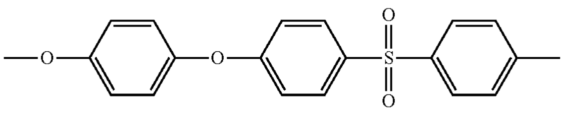

(jj)

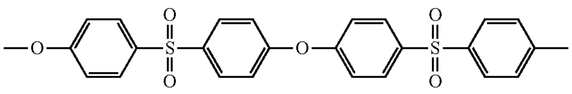

(jjj)

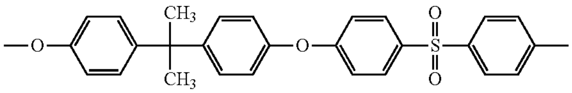

(jv)

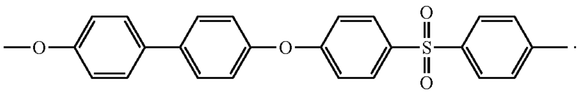

7. The composition (C) according to claim 5, wherein T' is selected from the group consisting of a bond, $-CH_2-$, $-C(O)-$, $-C(CH_3)_2-$, $-C(CF_3)_2-$, $-C(=CCl_2)-$, $-SO_2-$, $-C(CH_3)(CH_2CH_2COOH)-$, and a group of formula:

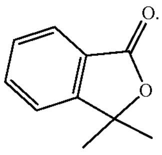

8. The composition according to claim 1, wherein polymer (SP) is at least one polymer (PESU), wherein recurring units ($R_{PESU}$) of polymer (PESU) are units of formula:

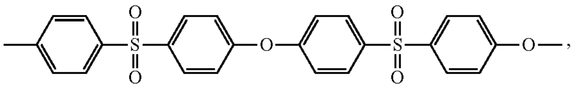

and wherein either polymer (PESU) contains essentially no recurring unit other than recurring units ($R_{PESU}$), or wherein polymer (PESU) comprises less than 50% moles of recurring units ($R_{PAES}$), different from recurring units ($R_{PESU}$), complying with formula (P-3):

$$-Ar^1-(T'-Ar^2)_n-O-Ar^3-SO_2-[Ar^4-(T-Ar^2)_n-SO_2]_m-Ar^5-O- \quad \text{(P-3)}$$

wherein:

$Ar^1$, $Ar^2$, $Ar^3$, $Ar^4$, and $Ar^5$, equal to or different from each other and at each occurrence, are independently an aromatic, substituted or unsubstituted, mono- or polynuclear group;

each T and T', equal to or different from each other and at each occurrence, is independently a bond or a divalent group optionally comprising one or more than one heteroatom;

n and m, equal to or different from each other, are independently zero or an integer of 1 to 5.

9. The composition (C) according to claim 8, wherein T' is selected from the group consisting of a bond, $-CH_2-$, $-C(O)-$, $-C(CH_3)_2-$, $-C(CF_3)_2-$, $-C(=CCl_2)-$, $-SO_2-$, $-C(CH_3)(CH_2CH_2COOH)-$, and a group of formula:

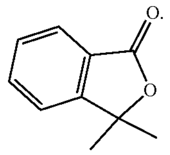

10. The composition (C) according to claim 1, wherein said composition (C) comprises copolymer (PEDEK-PEEK) and polymer (SP) in weight ratios of 20/80 to 80/20.

11. The composition (C) according to claim 1, wherein polymer (SP) is present in a weight amount of at least 30%, based on the combined weight of the copolymer (PEDEK-PEEK) and polymer (SP); and/or wherein composition (C) comprises polymer (SP) in a weight amount of less than 70%, based on the combined weight of the copolymer (PEDEK-PEEK) and polymer (SP).

12. The composition according to claim 11, wherein composition (C) comprises copolymer (PEDEK-PEEK) in an amount of 60 to 90% and the polymer (SP) is a polymer (PPSU) in an amount of 10 to 40%, based on the combined weight of the copolymer (PEDEK-PEEK) and polymer (PPSU).

13. The composition according to claim 1, wherein the composition (C) comprises the copolymer (PEDEK-PEEK) and polymer (SP), in a combined weight amount of at least 90%, based on the total weight of the composition (C).

14. The composition (C) according to claim 1, said composition comprising at least one reinforcing filler selected from fibrous and particulate fillers, and optionally one or more than one additional ingredient (I) different from the reinforcing filler and from the copolymer (PEDEK-PEEK), selected from the group consisting of: (i) colorants, (ii) pigments, (iii) light stabilizers, (iv) heat stabilizers, (v) antioxidants, (vi) acid scavengers, (vii) processing aids, (viii) nucleating agents, (ix) internal lubricants and/or external lubricants, (x) flame retardants, (xi) smoke-suppressing agents, (x) anti-static agents, (xi) anti-blocking agents, (xii) conductivity additives, (xiii) plasticizers, (xiv) flow modifiers, (xv) extenders, (xvi) metal deactivators, and combinations thereof;

wherein the weight of said reinforcing filler is below 60% wt., based on the total weight of the composition (C); and/or wherein the reinforcing filler is present in an amount ranging from 10 to 60% wt., based on the total weight of the composition (C).

15. A method of making the composition (C) according to claim 1, wherein said method involves admixing of the at least one copolymer (PEDEK-PEEK), at least one polymer (SP).

16. A composite material comprising a matrix of composition (C) according to claim 1, wherein the composite material is selected from the group consisting of:

composite materials comprising one or more than one ply of impregnated fabrics; and unidirectional (continuous or discontinuous) fiber reinforced tapes or prepregs; and multi-directional fiber reinforced tapes or prepregs comprising multiple layers of fiber-reinforced tapes or prepregs.

17. A shaped article comprising the composition (C) according to claim 1.

18. The shaped article according to claim 17, wherein the shaped article is selected from the group consisting of parts of an electrostatic discharge (ESD) protective device.

19. An oil & gas recovery article comprising at least a part comprising the composition (C) of claim 1.

20. A method for recovering oil and/or gas, the method comprising recovering oil and/or gas with at least one oil and gas recovery article according to claim 19.

* * * * *